United States Patent
Murakami et al.

(10) Patent No.: US 8,432,080 B2
(45) Date of Patent: Apr. 30, 2013

(54) ROTATING ELECTRICAL MACHINE

(75) Inventors: Souji Murakami, Kitakyushu (JP);
Motomichi Ohto, Kitakyushu (JP);
Haruki Yahara, Kitakyushu (JP);
Shinichi Nishi, Kitakyushu (JP)

(73) Assignee: Kabushiki Kaisha Yaskawa Denki, Kitakyushu-Shi (JP)

(*) Notice: Subject to any disclaimer, the term of this patent is extended or adjusted under 35 U.S.C. 154(b) by 242 days.

(21) Appl. No.: 12/853,297

(22) Filed: Aug. 10, 2010

(65) Prior Publication Data

US 2011/0057533 A1 Mar. 10, 2011

(30) Foreign Application Priority Data

Sep. 7, 2009 (JP) ................................. 2009-206125
Jun. 23, 2010 (JP) ................................. 2010-142725

(51) Int. Cl.
*H02K 21/12* (2006.01)
(52) U.S. Cl.
USPC ............ 310/156.43; 310/156.08; 310/156.11; 310/156.22
(58) Field of Classification Search .............. 310/55, 310/154.43, 156.08, 156.11, 156.22, 156.29, 310/156.43, 156.62, 156.64, 185
See application file for complete search history.

(56) References Cited

U.S. PATENT DOCUMENTS

| | | | | |
|---|---|---|---|---|
| 4,639,627 A * | 1/1987 | Takekoshi et al. | ........ | 310/156.22 |
| 7,157,827 B2 * | 1/2007 | Heideman et al. | ..... | 310/216.001 |
| 2004/0021396 A1 * | 2/2004 | Ehrhart et al. | ................ | 310/271 |
| 2005/0040721 A1 * | 2/2005 | Kusase et al. | ............ | 310/156.43 |
| 2006/0006744 A1 | 1/2006 | Nashiki | | |
| 2006/0191601 A1 * | 8/2006 | Komuro et al. | ............... | 148/302 |
| 2006/0273684 A1 | 12/2006 | Ishikawa et al. | | |
| 2008/0197739 A1 | 8/2008 | Nashiki | | |
| 2010/0060223 A1 | 3/2010 | Sakai et al. | | |
| 2010/0066189 A1 * | 3/2010 | Horng et al. | ............. | 310/156.09 |
| 2010/0171385 A1 | 7/2010 | Sakai et al. | | |

FOREIGN PATENT DOCUMENTS

| | | |
|---|---|---|
| EP | 1416617 A1 * | 5/2004 |
| JP | 2006-025559 | 1/2006 |
| JP | 2006-217771 | 8/2006 |
| JP | 2006217771 A * | 8/2006 |
| JP | 2006-340487 | 12/2006 |
| JP | 2008-048514 | 2/2008 |
| JP | 2008-245368 | 10/2008 |
| WO | WO 2006/126552 | 11/2006 |

OTHER PUBLICATIONS

Machine Trnaslation JP2006217771 (2006).*
Machine Translation EP1416617 (2004).*

* cited by examiner

*Primary Examiner* — Tran Nguyen
*Assistant Examiner* — Jose Gonzalez Quinones
(74) *Attorney, Agent, or Firm* — Ditthavong Mori & Steiner, P.C.

(57) ABSTRACT

This invention provides a rotating electrical machine including a rotor that has an even number of first permanent magnets aligned in a circumferential direction of the rotor, second permanent magnets of a number equal to that of the first permanent magnets, provided respectively between the stator and circumferential ends of the first permanent magnets adjacent to each other in the circumferential direction, and core pieces of a number equal to that of the first permanent magnets, provided respectively between the second permanent magnets adjacent to each other in the circumferential direction.

13 Claims, 21 Drawing Sheets number of magnetic poles = 6 number of magnetic poles = 8

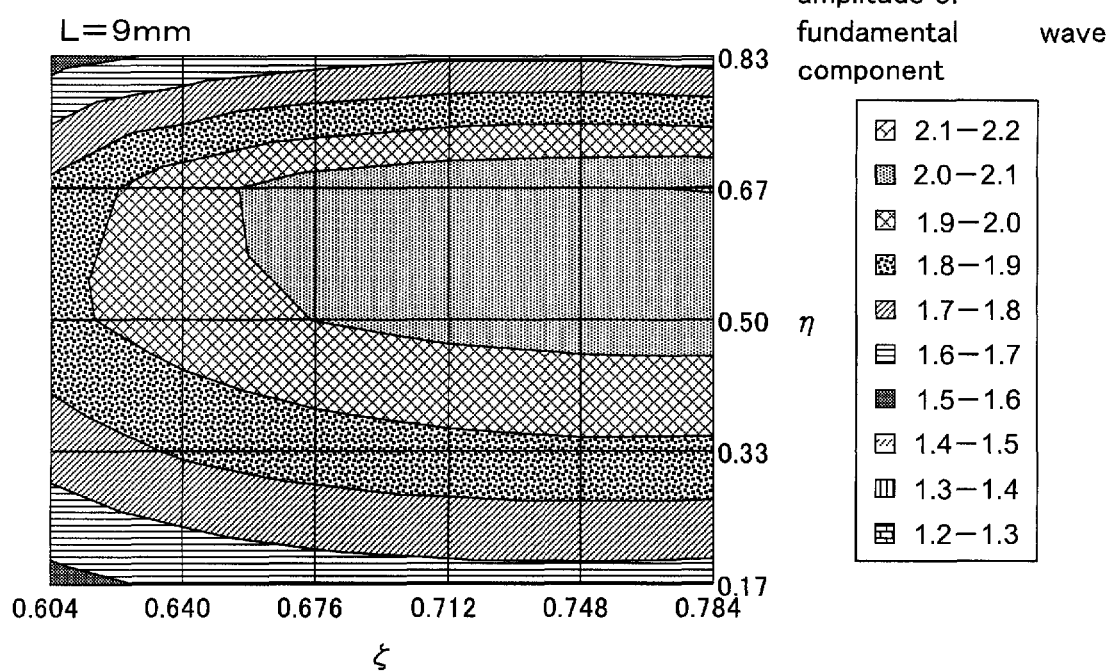

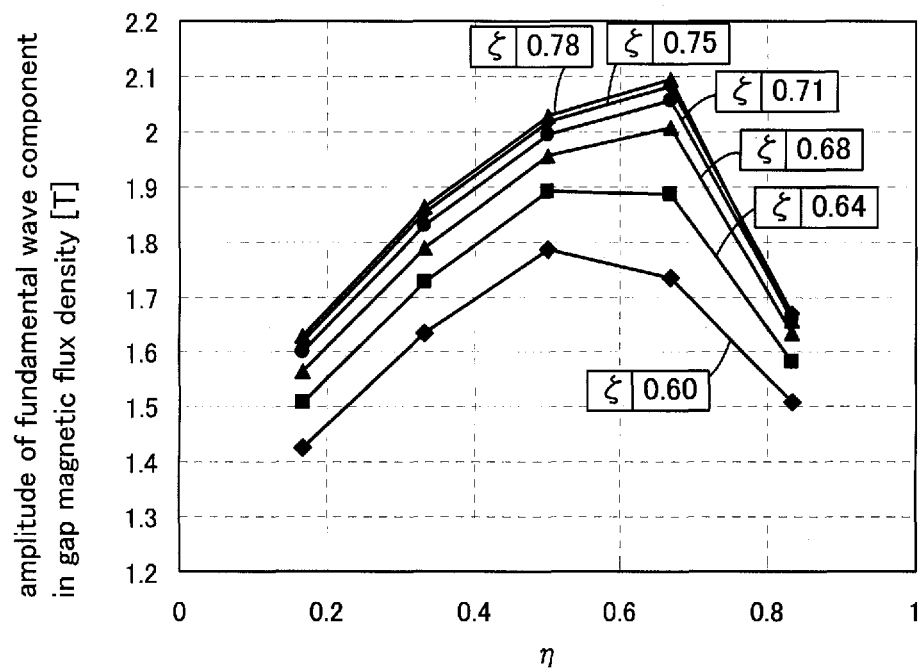

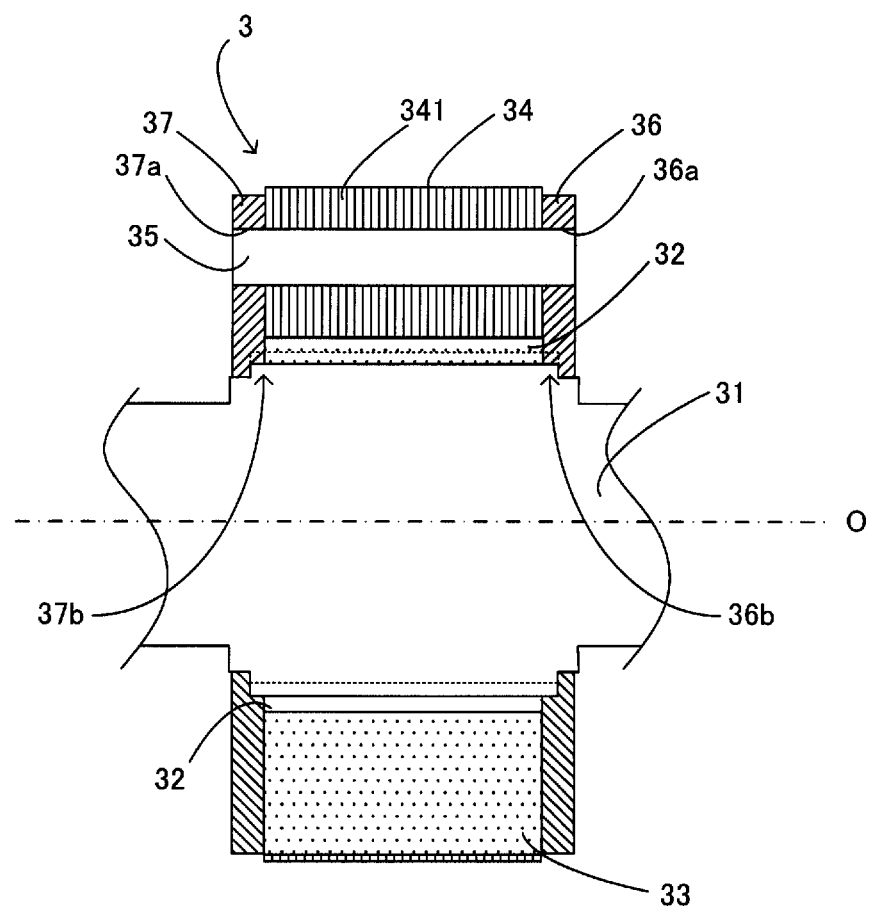

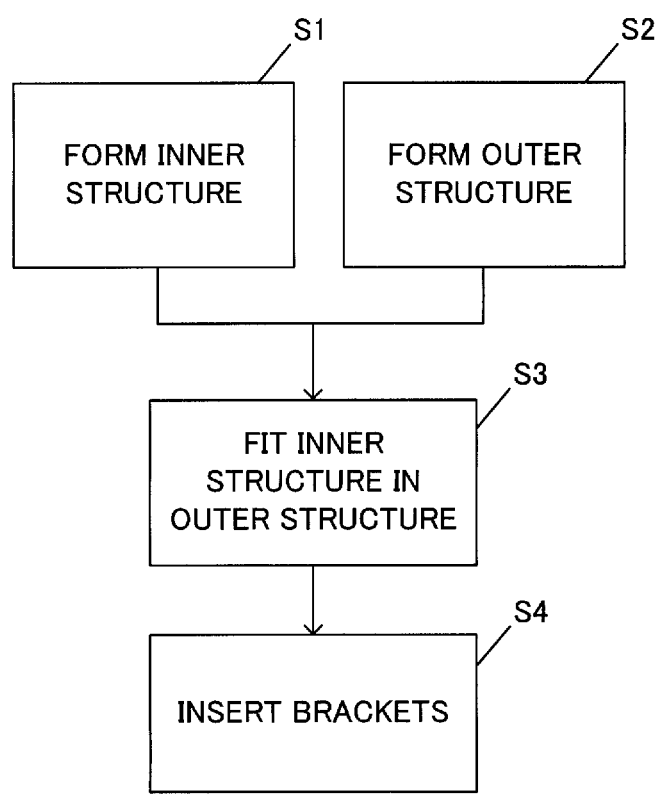

ROTATING ELECTRICAL MACHINE

The present application claims priority under 35 U.S.C. §119 to Japanese Patent Applications No. 2009-206125 filed on Sep. 7, 2009 and No. 2010-142725 filed on Jun. 23, 2010. The contents of the application are incorporated herein by reference in their entirety.

BACKGROUND OF THE INVENTION

1. Field of the Invention

The present invention relates to a rotating electrical machine and a manufacturing method therefor.

2. Description of the Related Art

In rotating electrical machines, there has been proposed a technique for increasing a maximum value of a magnetic flux density in a gap between a stator and a rotor (hereinafter, referred to as a gap magnetic flux density) (see Japanese Unexamined Patent Publication JP 2006-217771, for example). In this proposal, permanent magnets used in the rotor are aligned in accordance with an array method referred to as the MFCSPM (Magnetic Flux Concentrated Surface Permanent Magnet) array.

SUMMARY OF THE INVENTION

According to an aspect of the present invention, a rotating electrical machine includes a rotor having an outer circumferential end, and a stator surrounding the outer circumferential end of the rotor with a gap provided therebetween, the rotor including: an even number of first permanent magnets aligned in a circumferential direction of the rotor; second permanent magnets of a number equal to that of the first permanent magnets, provided respectively between the stator and circumferential ends of the first permanent magnets adjacent to each other in the circumferential direction; and core pieces of a number equal to that of the first permanent magnets, provided respectively between the second permanent magnets adjacent to each other in the circumferential direction, wherein each of the first permanent magnets has a direction of magnetization in parallel with a radial direction of the rotor, the directions of magnetization of the first permanent magnets adjacent to each other in the circumferential direction are opposite to each other, each of the second permanent magnets has a direction of magnetization perpendicular to the radial direction, the directions of magnetization of the second permanent magnets adjacent to each other in the circumferential direction are opposite to each other, and the first permanent magnet and the two second permanent magnets which are adjacent to the core piece have magnetic poles identical to one another on ends facing the core piece.

According to an embodiment of the present invention, there is provided a method for manufacturing a rotating electrical machine including a rotor having an outer circumferential end, and a stator surrounding the outer circumferential end of the rotor with a gap provided therebetween. The method includes the steps of: forming a first structure by accommodating first permanent magnets respectively in an even number of grooves that are provided in an outer circumferential end of a shaft and integrating the shaft with the first permanent magnets; forming a second structure by accommodating second permanent magnets respectively in spaces between core pieces and integrating the core pieces and the second permanent magnets, the core pieces of a number equal to that of the first permanent magnets being aligned at a constant interval in a circumferential direction and being connected with each other at outer circumferential ends thereof; and forming the rotor by fitting the first structure in an inner circumferential end of the second structure such that the second permanent magnets are located radially outside with respect to circumferential ends of the first permanent magnets adjacent to each other in a circumferential direction of the shaft, wherein each of the first permanent magnets has a direction of magnetization in parallel with a radial direction of the shaft, the directions of magnetization of the first permanent magnets adjacent to each other in the circumferential direction are opposite to each other, each of the second permanent magnets has a direction of magnetization perpendicular to the radial direction, the directions of magnetization of the second permanent magnets adjacent to each other in the circumferential direction are opposite to each other, and the first permanent magnet and the two second permanent magnets which are adjacent to the core piece have magnetic poles identical to one another on ends facing the core piece.

BRIEF DESCRIPTION OF THE DRAWINGS

FIG. 5C is a contour graph indicating a result of a magnetic field analysis in a case where the first permanent magnets are 9 mm thick;

FIG. 6 is a graph of ordinary polygonal lines obtained by converting contour lines of FIG. 4C;

FIG. 11B is a view showing brackets in addition to the structure of FIG. 11A;

FIG. 17 is a flowchart briefly showing a method for manufacturing the rotor according to one of the second and third embodiments.

DETAILED DESCRIPTION OF THE PREFERRED EMBODIMENTS

First Embodiment

In a rotating electrical machine according to a first embodiment of the present invention, permanent magnets used in a rotor are aligned in accordance with an array method referred to as the MMASPM (Magnetic Material Attached Surface Permanent Magnet) array. This array is described specifically with reference to FIG. 1.

Figure 1:
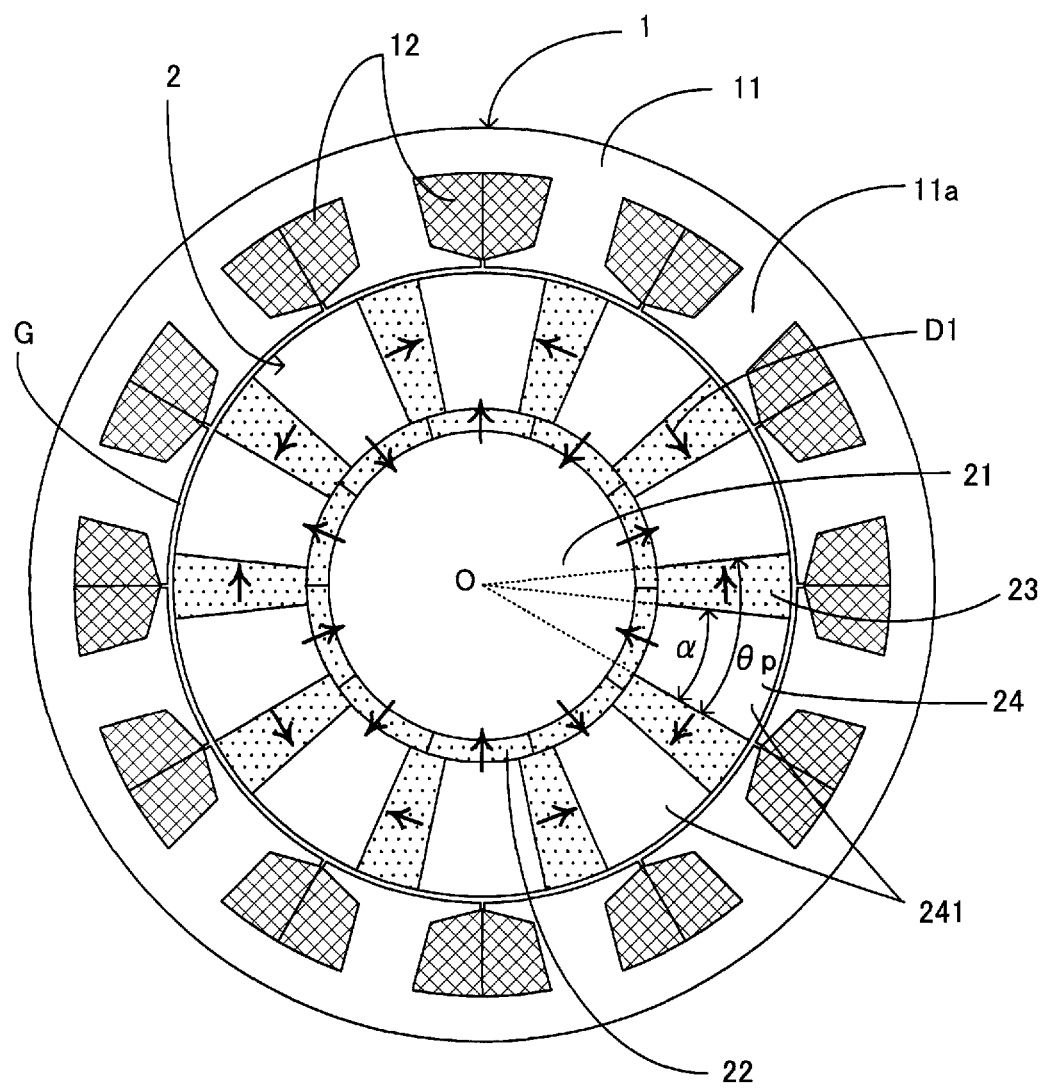
FIG. 1 is a cross sectional view of a rotating electrical machine according to a first embodiment.

FIG. 1 is a cross sectional view of the rotating electrical machine according to the first embodiment. FIG. 1 illustrates a rotational axis O of the rotor. Shown in FIG. 1 is a cross section of the rotating electrical machine taken along a line perpendicular to the rotational axis O. FIG. 1 also illustrates a gap G provided between the rotor and a stator. Directions of magnetization of the permanent magnets are indicated in FIG. 1 by arrows D1 in either direction.

In FIG. 1, the rotating electrical machine according to the first embodiment includes a stator 1 and a rotor 2. The stator 1 surrounds the rotor 2 having a substantially cylindrical shape with the gap G provided therebetween. The stator 1 has a stator core 11 and stator windings 12. The stator windings 12 are provided among teeth 11a of the stator core 11. FIG. 1 exemplifies a case where twelve teeth 11a are provided.

In this example, the rotating electrical machine functions as an electric motor. In this case, when current or the like flows in the stator windings 12, there is generated a rotating magnetic field that causes the rotor 2 to rotate in the circumferential direction thereof.

The rotor 2 has a shaft 21, first permanent magnets 22, second permanent magnets 23, and a rotor core 24. An even number of the first permanent magnets 22 are provided to surround the shaft 21 having a substantially columnar shape. FIG. 1 exemplifies a case where ten first permanent magnets 22 are provided.

The first permanent magnets 22 are aligned in the circumferential direction of the shaft 21 (the circumferential direction of the rotor 2) such that respective directions of magnetization thereof are alternately radially outward and radially inward with respect to the shaft 21. Accordingly, the directions of magnetization of the respective first permanent magnets 22 are in parallel with the radial direction of the shaft 21, and the directions of magnetization of the first permanent magnets 22 adjacent to each other in the circumferential direction of the shaft 21 are opposite to each other. The number of the second permanent magnets 23 is equal to that of the first permanent magnets 22, and the second permanent magnets 23 are provided to surround the first permanent magnets 22. Each of the second permanent magnets 23 is disposed radially outside the circumferential ends of the corresponding two first permanent magnets 22 that are adjacent to each other in the circumferential direction of the shaft 21. More specifically, each of the second permanent magnets 23 is disposed between the stator 1 and end surfaces perpendicular to the circumferential direction of the corresponding two first permanent magnets 22 which face each other in the circumferential direction of the shaft 21. The directions of magnetization of the second permanent magnets 23 are perpendicular to the radial direction of the shaft 21 (the radial direction of the rotor 2). The directions of magnetization of the second permanent magnets 23 adjacent to each other in the circumferential direction of the shaft 21 are opposite to each other.

The rotor core 24 is configured by core pieces 241 that are provided between the stator 1 and the first permanent magnets 22 as well as between the second permanent magnets 23 adjacent to each other in the circumferential direction of the shaft 21. Magnetic poles of the second permanent magnets 23 that are adjacent to each other in the circumferential direction of the shaft 21 and face the core piece 241 therebetween are identical with that of the first permanent magnet 22 facing the same core piece 241. In other words, in the first permanent magnet 22 and the two second permanent magnets 23 which are adjacent to the same core piece 241, the magnetic poles are identical to one another on the ends facing the core piece 241.

Each of the core pieces 241 configuring the rotor core 24 is made of a soft magnetic material. The number of the core pieces 241 is equal to that of the first permanent magnets 22. FIG. 1 indicates an open angle α of each of the core pieces 241, and an open angle θp for one magnetic pole configured by the second permanent magnet 23 and the core piece 241 adjacent to each other in the circumferential direction of the rotor 2. That is, the open angle θp is a sum of the open angle of the second permanent magnet 23 and the open angle of the core piece 241 which are adjacent to each other in the circumferential direction of the rotor 2. It is noted that an open angle referred to herein is an angle opened with respect to the center of rotation (the rotational axis O) of the rotor 2.

Figure 2:
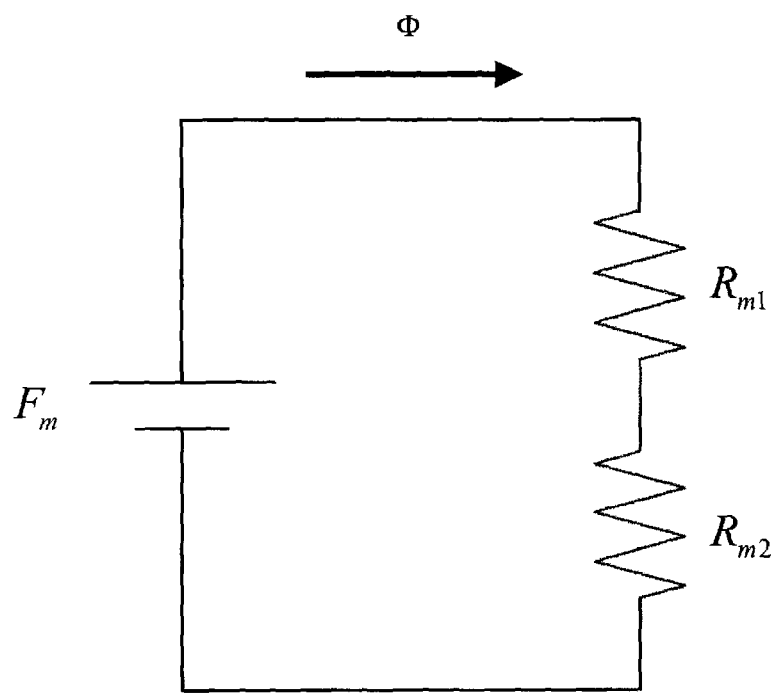
FIG. 2 is a magnetic circuit diagram in the MFCSPM array.

Described next with reference to FIG. 2 is a principle that the MMASPM array adopted in the first embodiment increases more easily an amplitude of a fundamental wave component in a gap magnetic flux density, in comparison to the MFCSPM array. FIG. 2 is a magnetic circuit diagram in the MFCSPM array.

First described briefly is the MFCSPM array. An even number of the first permanent magnets are provided to surround the rotor core. The first permanent magnets are aligned in the circumferential direction of the rotor core such that respective directions of magnetization are alternately radially outward and radially inward with respect to the rotor core. The number of the second permanent magnets is equal to that of the first permanent magnets, and each of the second permanent magnets is disposed radially outside the circumferential ends of the corresponding two first permanent magnets that are adjacent to each other in the circumferential direction of the rotor core. The second permanent magnets are aligned in the circumferential direction of the rotor core at a constant interval. There is thus formed a space (in other words, an air space) between the two second permanent magnets that are adjacent to each other in the circumferential direction of the rotor core. The second permanent magnets have directions of magnetization perpendicular to the radial direction of the rotor core. The directions of magnetization of the second permanent magnets adjacent to each other in the circumferential direction of the rotor core are opposite to each other. The first permanent magnet and the two second permanent magnets which are adjacent to each of the spaces have magnetic poles identical to one another on ends facing the space.

The rotor of the MFCSPM array is configured by the permanent magnets, the second permanent magnets, and the rotor core described above.

FIG. 2 indicates a magnetomotive force Fm of the first and second permanent magnets, a magnetoresistance Rm1 in the gap, and a magnetoresistance Rm2 between the second permanent magnets adjacent to each other in the circumferential direction of the rotor. It is noted that the components of the magnetic circuit in the MFCSPM array also include the rotor core provided radially inside the respective first permanent magnets. However, the magnetoresistance of the rotor core is ignored herein as it is sufficiently smaller than that of air.

A magnetic flux Φ generated in the magnetic circuit shown in FIG. 2 is obtained by dividing the magnetomotive force Fm by the sum of the magnetoresistances (Rm1+Rm2). Accordingly, the amplitude of the fundamental wave component in the gap magnetic flux density can be increased by decreasing the sum of the magnetoresistance Rm1 in the gap and the magnetoresistance Rm2 between the adjacent second permanent magnets. In this case, when the length of the gap is constant, the magnetoresistance Rm1 in the gap can be regarded as being constant. Accordingly, it is possible to increase the amplitude of the fundamental wave component in the gap magnetic flux density by decreasing the magnetoresistance Rm2 between the adjacent second permanent magnets.

However, the MFCSPM array is provided with spaces between the adjacent second permanent magnets. More specifically, there exists air, which is a substance of a low magnetic permeability, between the adjacent second permanent magnets. Thus, although the maximum value of the gap magnetic flux density is increased, it is difficult to decrease the magnetoresistance Rm2 between the adjacent second permanent magnets, failing to increase the amplitude of the fundamental wave component in the gap magnetic flux density. As a result, it has been difficult to achieve reduction in size and increase in output power.

To the contrary, the MMASPM array adopted in the first embodiment is provided with the core pieces 241 having a high magnetic permeability between the adjacent second permanent magnets. Accordingly, it is possible to decrease more easily the magnetoresistance Rm2 between the adjacent second permanent magnets in comparison to the MFCSPM array. Thus decreased more easily is the sum of the magnetoresistances (Rm1+Rm2) in comparison to the MFCSPM array, which easily increases the amplitude of the fundamental wave component in the gap magnetic flux density. As a result, it is possible to easily realize reduction in size as well as increase in output power.

As described above, there are provided the core pieces 241 between the second permanent magnets 23 adjacent to each other in the circumferential direction of the rotor 2. Therefore, it is possible to easily increase the amplitude of the fundamental wave component in the gap magnetic flux density as well as to easily realize reduction in size and increase in output power.

Described next is a reason why the amplitude of the fundamental wave component in the gap magnetic flux density has a maximum value (a peak value) according to the open angle α of the core piece 241 in the MMASPM array adopted in the first embodiment. For easier understanding, assume in the following description that, regardless of change in the open angle α of the core piece 241, the amount of the magnetic flux generated by the first permanent magnet 22 is constant and is sufficiently smaller than the amount of the magnetic flux generated by the second permanent magnet 23. In this case, the total amount of the magnetic fluxes in the gap is substantially equal to the amounts of the magnetic fluxes generated by the second permanent magnets 23.

The amount of the magnetic flux generated by each of the second permanent magnets 23 is uniquely determined by the following equation when the shape of the second permanent magnet 23 is fixed. Equation (1) provides a permeance p of a permanent magnet, Equation (2) provides a magnetic flux density Bd of the second permanent magnet 23 at an operating point thereof, and Equation (3) provides a magnetic flux Φ2 generated by the second permanent magnet 23. In these equations, μ0 indicates a magnetic permeability of air, σ and f each indicate a leakage factor, Lmag indicates a length of a magnetic path of the second permanent magnet 23, Amag indicates a cross sectional area of the magnetic path of the second permanent magnet 23, Lgap indicates a length of the gap, Agap indicates a cross sectional area of a magnetic path of the gap, Br indicates a residual magnetic flux density of the second permanent magnet 23, and bHc indicates a coercive force of the second permanent magnet 23.

[Expression 1]

$$p = \mu_0 \frac{\sigma}{f} \frac{L_{mag}}{A_{mag}} \frac{A_{gap}}{L_{gap}} \quad \text{Equation (1)}$$

[Expression 2]

$$B_d = \frac{1}{1 + \frac{1}{p}\frac{B_r}{{}_bH_c}} B_r \quad \text{Equation (2)}$$

[Expression 3]

$$\Phi 2 = B_d A_{mag} \quad \text{Equation (3)}$$

In this case, the distribution waveform of the gap magnetic flux density generally has a trapezoidal shape, and a maximum value Bgm thereof is obtained by Equation (4). Acore indicates an area of the surface facing the gap of the core piece 241.

[Expression 4]

$$B_{gm} = \frac{\Phi 2}{A_{core}} \quad \text{Equation (4)}$$

As apparent from Equations (1) to (4), the value Lmag/Amag and the permeance p are increased as the thickness of the second permanent magnet 23 is increased in the direction of the magnetic path. Increase in the permeance p causes increase in the magnetic flux density Bd at the operating point as well as increase in the maximum value Bgm of the gap magnetic flux density. Since the gap magnetic flux density has the distribution waveform in the trapezoidal shape, the amplitude of the fundamental wave component in the gap magnetic flux density is also increased.

However, in a case where the second permanent magnet 23 is too thick in the magnetic path direction, the open angle α of the core piece 241 is too small, which deforms the distribution waveform of the gap magnetic flux density into a triangular shape having sharp peaks. Decreased as a result is an amplitude Bg1 of the fundamental wave component in the gap magnetic flux density, as expressed by Equation (5).

[Expression 5]

$$B_{g1} = \frac{4}{\pi^2} \frac{1}{1-\eta} \left[ \cos\left(\frac{\pi}{2}\eta\right) - \cos\left(\pi\left(1 - \frac{\eta}{2}\right)\right) \right] B_{gm} \quad \text{Equation (5)}$$

A rate η is defined in Equation (6) by the open angle α of the core piece 241 and the open angle θp of one magnetic pole (the second permanent magnet 23 and the core piece 241 adjacent to each other). As defined in Equation (6), the rate η indicates a rate of the open angle α of the core piece 241 relative to the total angle θp of the open angle of the second permanent magnet 23 and the open angle of the core piece 241 adjacent to each other in the circumferential direction of the rotor 2.

[Expression 6]

$$\eta = \frac{\alpha}{\theta_p} \quad \text{Equation (6)}$$

As described above, the amplitude of the fundamental wave component in the gap magnetic flux density has the peak value according to the open angle α of the core piece 241.

Figure 3:
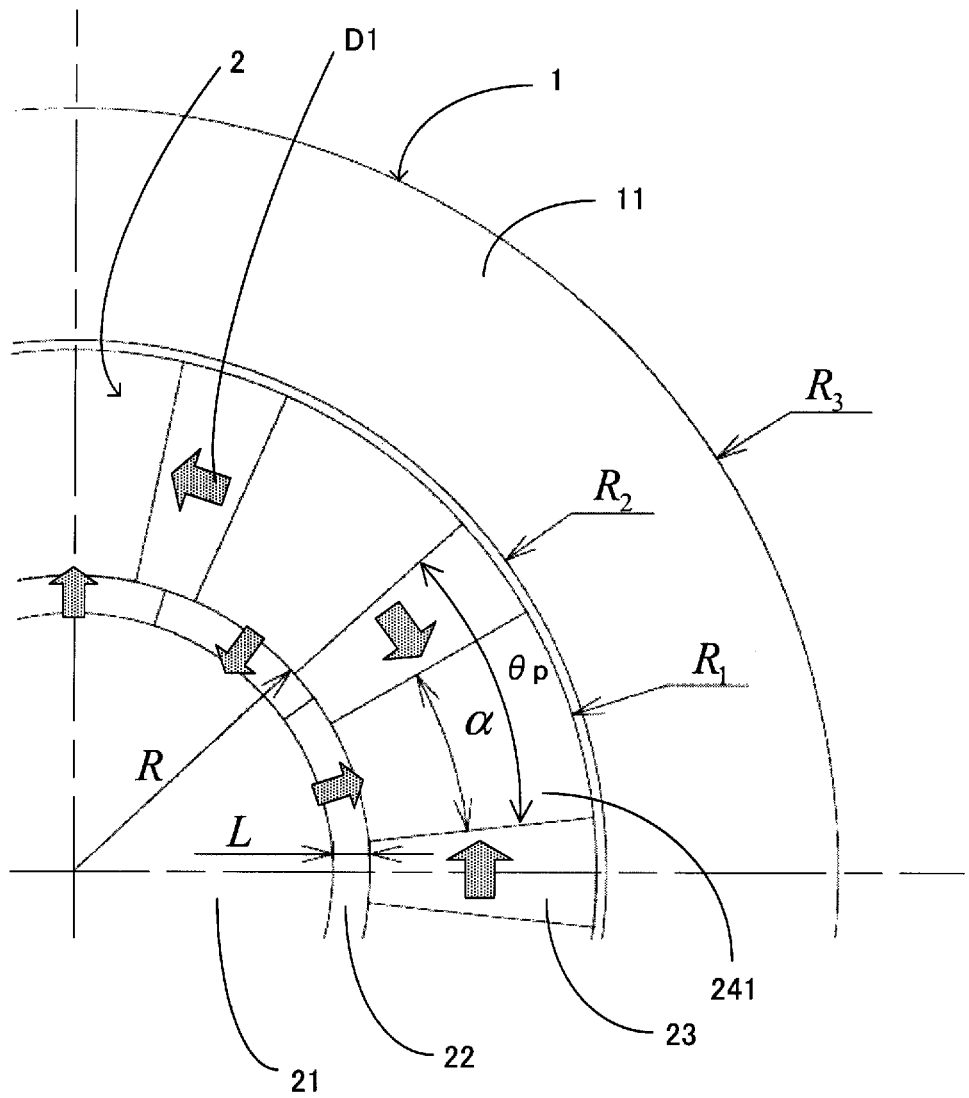
FIG. 3 is a diagram indicating sizes of respective components relevant to magnetic field analyses.

Described next, in accordance with magnetic field analyses, is the value of the open angle α of the core piece 241 in the case where the amplitude of the fundamental wave component in the gap magnetic flux density reaches the peak value. As shown in FIG. 3, in the magnetic field analyses, the stator core 11 of the stator 1 was provided as a smooth cylindrical iron core configured by an electromagnetic steel plate. The length of the gap G, an outer radius R1 of the rotor 2, an inner radius R2 of the stator 1, and an outer radius R3 of the stator 1 were set to 0.8 mm, 41.7 mm, 42.5 mm, and 61 mm, respectively. Then studied was change in the amplitude of the fundamental wave component in the gap magnetic flux density in a case where the rate η defined by Equation (6) and the rate ζ defined by Equation (7) were changed. FIG. 3 is a diagram indicating sizes of respective components relevant to the magnetic field analyses. Each of the arrows D1 in either direction indicates the direction of magnetization of the corresponding permanent magnet. Also indicated in FIG. 3 are an outer radius R of the first permanent magnets 22 that are provided to surround the shaft 21, and a thickness L of the first permanent magnet 22 in the radial direction of the rotor 2. As defined in Equation (7), the rate ζ indicates a rate of the thickness of the core piece 241 in the radial direction of the rotor 2 relative to the outer radius R1 of the rotor 2.

[Expression 7]

$$\zeta = \frac{R_1 - R}{R_1} \quad \text{Equation (7)}$$

Figure 4A:
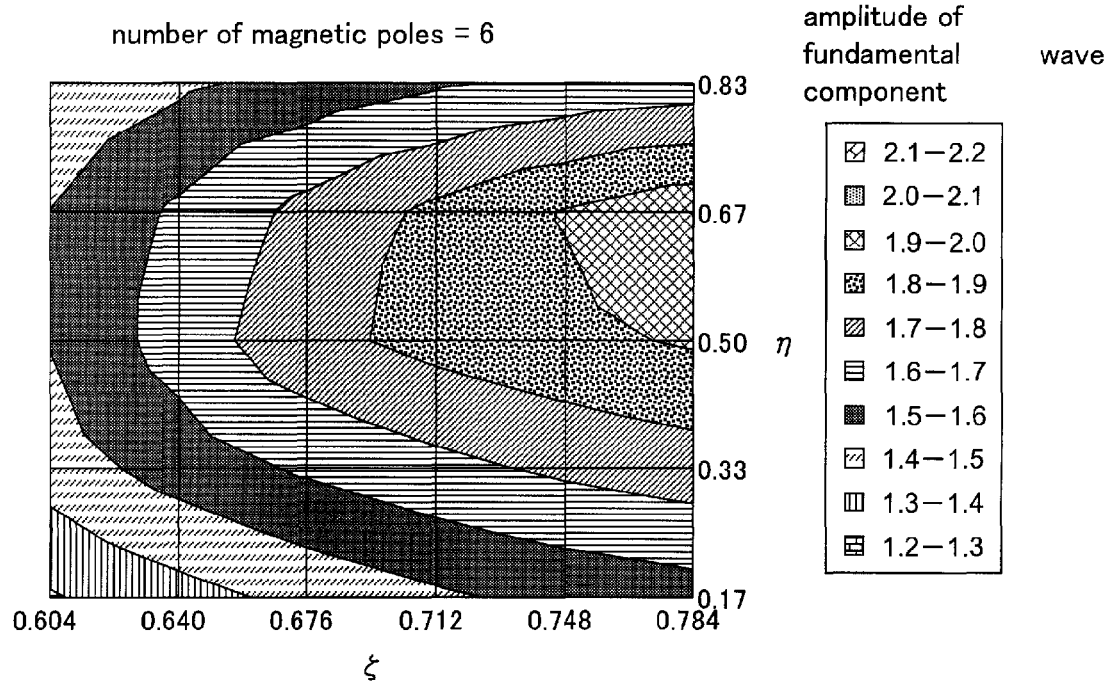
FIG. 4A is a contour graph indicating a result of a magnetic field analysis in a case where six magnetic poles are provided.
Figure 4B:
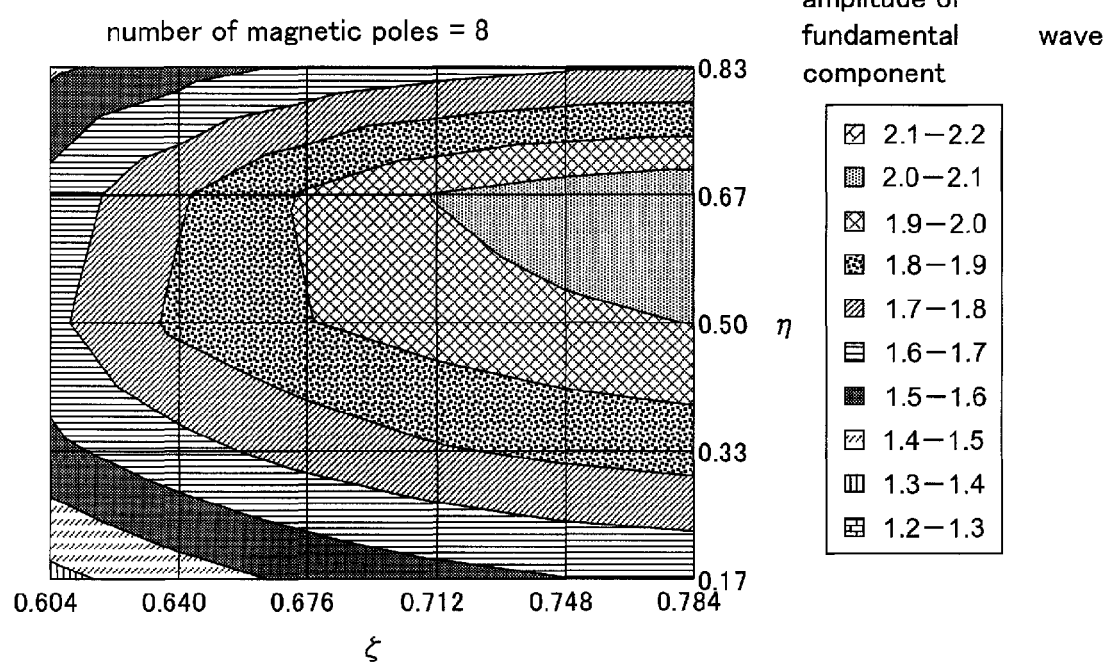
FIG. 4B is a contour graph indicating a result of a magnetic field analysis in a case where eight magnetic poles are provided.
Figure 4C:
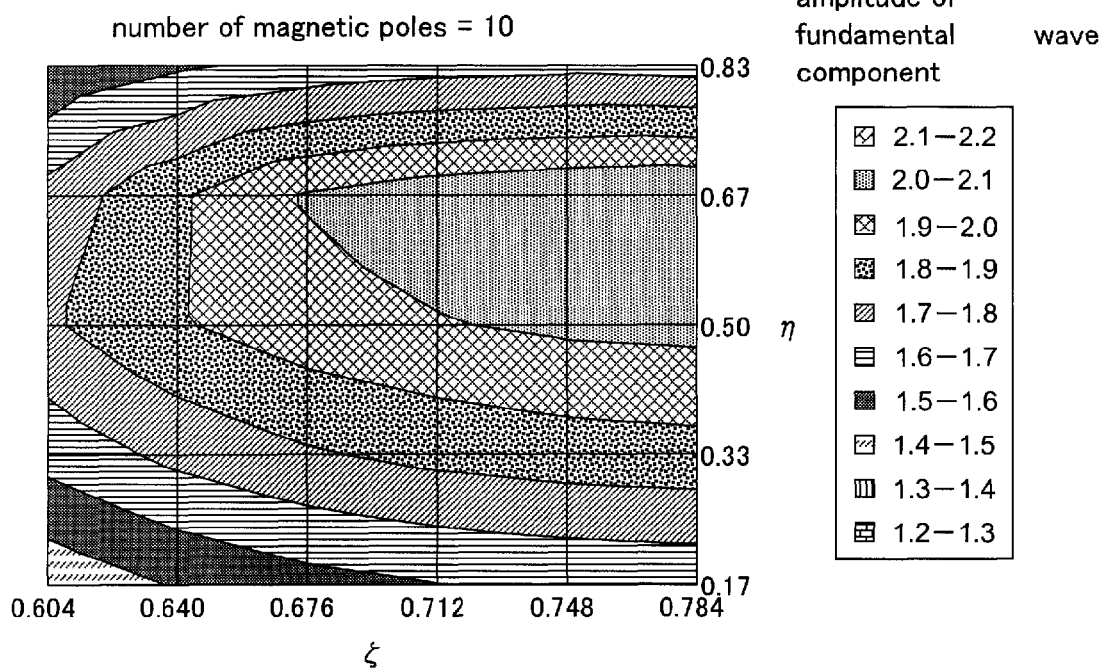
FIG. 4C is a contour graph indicating a result of a magnetic field analysis in a case where ten magnetic poles are provided.
Figure 4D:
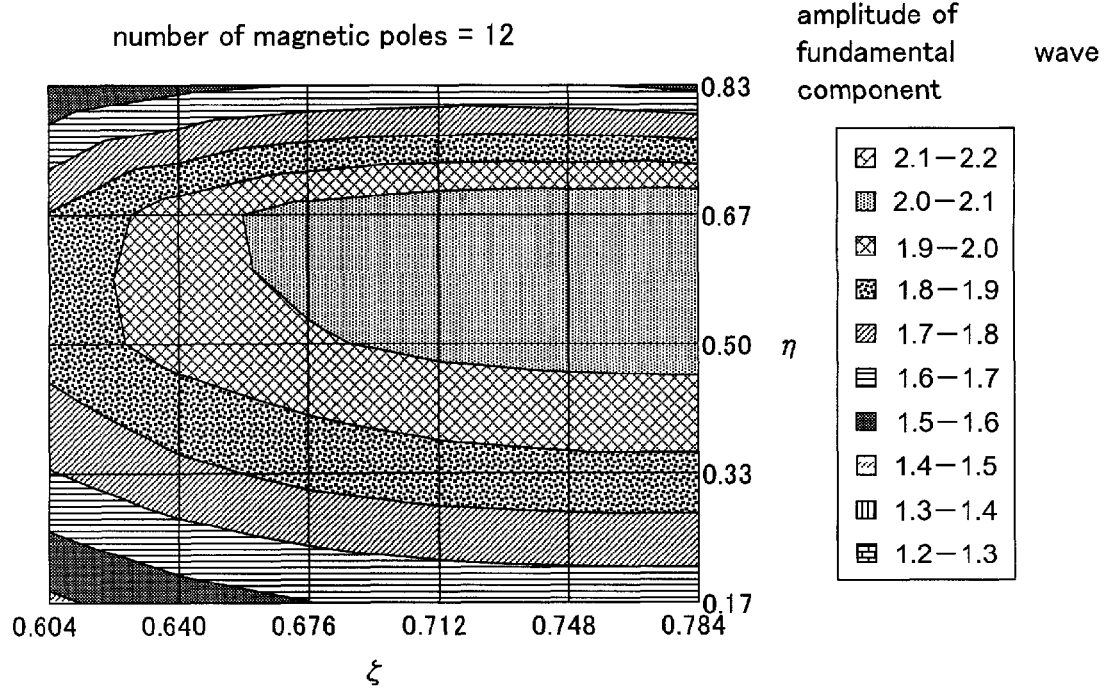
FIG. 4D is a contour graph indicating a result of a magnetic field analysis in a case where twelve magnetic poles are provided.

FIGS. 4A to 4D respectively show results of the magnetic field analyses indicative of the relations among the rate η, the rate ζ, and the amplitude of the fundamental wave component in the gap magnetic flux density in cases where the different numbers of the magnetic poles are provided. FIG. 4A is a contour graph indicating a result in a case where six magnetic poles are provided, FIG. 4B is a contour graph indicating a result in a case where eight magnetic poles are provided, FIG. 4C is a contour graph indicating a result in a case where ten magnetic poles are provided, and FIG. 4D is a contour graph indicating a result in a case where twelve magnetic poles are provided.

Figure 5A:
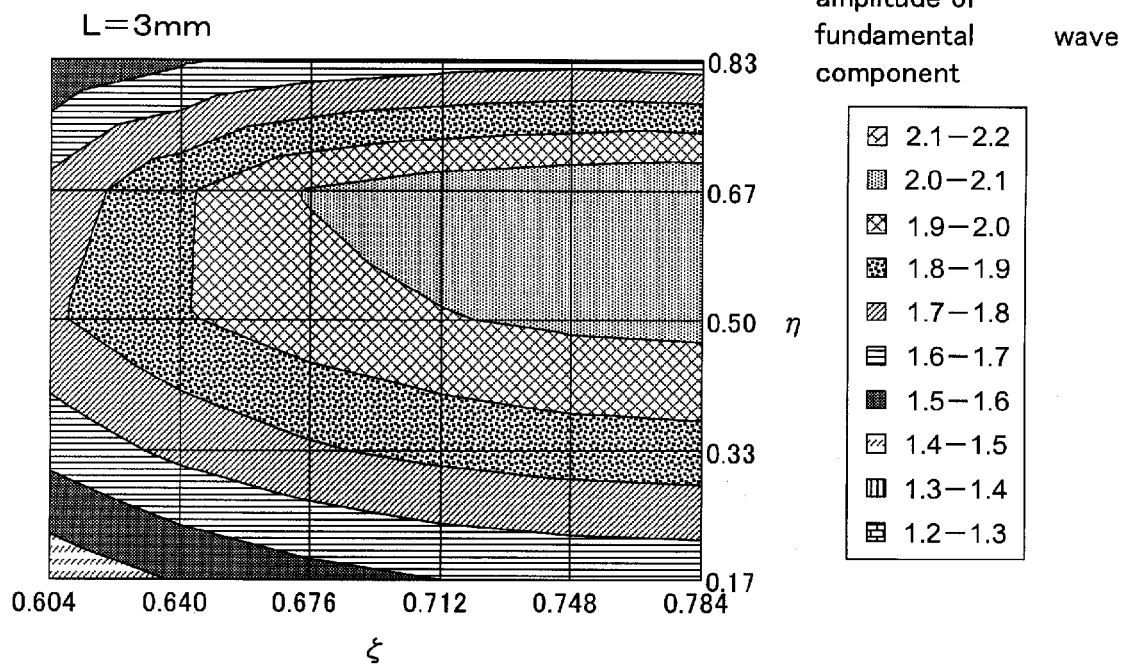
FIG. 5A is a contour graph indicating a result of a magnetic field analysis in a case where first permanent magnets are 3 mm thick.
Figure 5B:
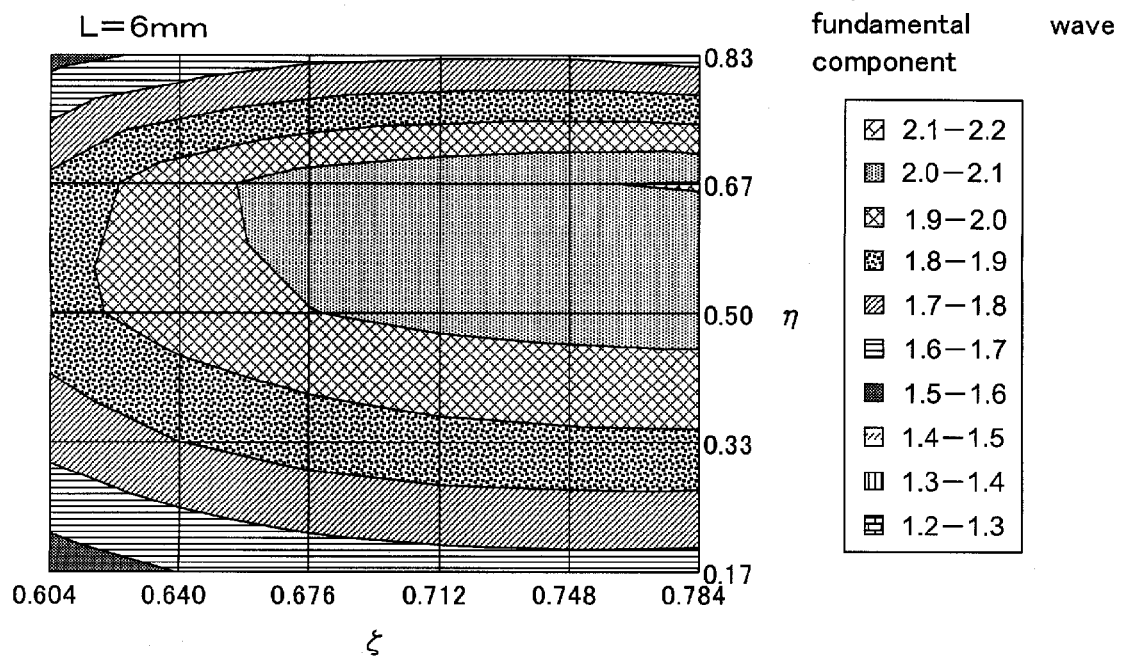
FIG. 5B is a contour graph indicating a result of a magnetic field analysis in a case where the first permanent magnets are 6 mm thick.

FIGS. 5A to 5C respectively show results of the magnetic field analyses indicative of the relations among the rate η, the rate ζ, and the amplitude of the fundamental wave component in the gap magnetic flux density in cases where the first permanent magnet 22 has different thicknesses L in the radial direction of the rotor 2. FIG. 5A is a contour graph indicating a result in a case where the thickness L is 3 mm, FIG. 5B is a contour graph indicating a result in a case where the thickness L is 6 mm, and FIG. 5C is a contour graph indicating a result in a case where the thickness L is 9 mm.

As apparent from FIG. 4A, when the amplitude of the fundamental wave component in the gap magnetic flux density reaches the peak value, the value of the rate η falls in a range approximately from 0.5 to 0.7. This is true, regardless of the number of the magnetic poles, as seen from the results shown in FIGS. 4B to 4D. This is also true, regardless of the value of the thickness L, as seen from the results shown in FIGS. 5A to 5C. Further, this is true regardless of the value of the rate ζ, as seen from the results shown in FIGS. 4A to 4D as well as FIGS. 5A to 5C. Moreover, changes in the radii R1 to R3 lead only to approximations with similar results.

According to the above, the value of the amplitude of the fundamental wave component in the gap magnetic flux density can be approximated to the peak value according to arbitrary values of the rate ζ, the number of the magnetic poles, the radii R1 to R3, and the thickness L, by setting the rate η to be within the range from 0.5 to 0.7.

As also apparent from FIG. 4A, when the amplitude of the fundamental wave component in the gap magnetic flux density reaches the peak value, the value of the rate η is changed within the range from 0.5 to 0.7 and in accordance with the value of the rate ζ. According to the results shown in FIGS. 4A to 4D, the distribution of the gap magnetic flux density is hardly changed even when the number of the magnetic poles is changed. Similarly, according to the results shown in FIGS. 5A to 5C, the distribution of the gap magnetic flux density is hardly changed even when the thickness L is changed. In other words, when the amplitude of the fundamental wave component in the gap magnetic flux density reaches the peak value, the value of the rate η is hardly dependent on the number of the magnetic poles and the thickness L. Further, changes in the radii R1 to R3 lead only to approximations with similar results.

As described above, when the amplitude of the fundamental wave component in the gap magnetic flux density reaches the peak value, the value of the rate η changes within the range from 0.5 to 0.7 and in accordance with the value of the rate ζ. Described below is the relation between the rate ζ and the rate η in the case where the amplitude of the fundamental wave component in the gap magnetic flux density reaches the peak value. For easier understanding, the following description is based on the result of the magnetic field analysis in the case where ten magnetic poles are provided and the thickness L is 3 mm. However, the following description is applicable to an arbitrary number of the magnetic poles and an arbitrary value of the thickness L.

FIG. 6 is a graph of ordinary polygonal lines obtained by converting contour lines of FIG. 4C. The respective polygonal lines indicate the changes in the amplitudes of the fundamental wave components in the gap magnetic flux densities according to the rate η in cases where the values of the rate ζ are 0.6, 0.64, 0.68, 0.71, 0.75, and 0.78, respectively.

Figure 7:
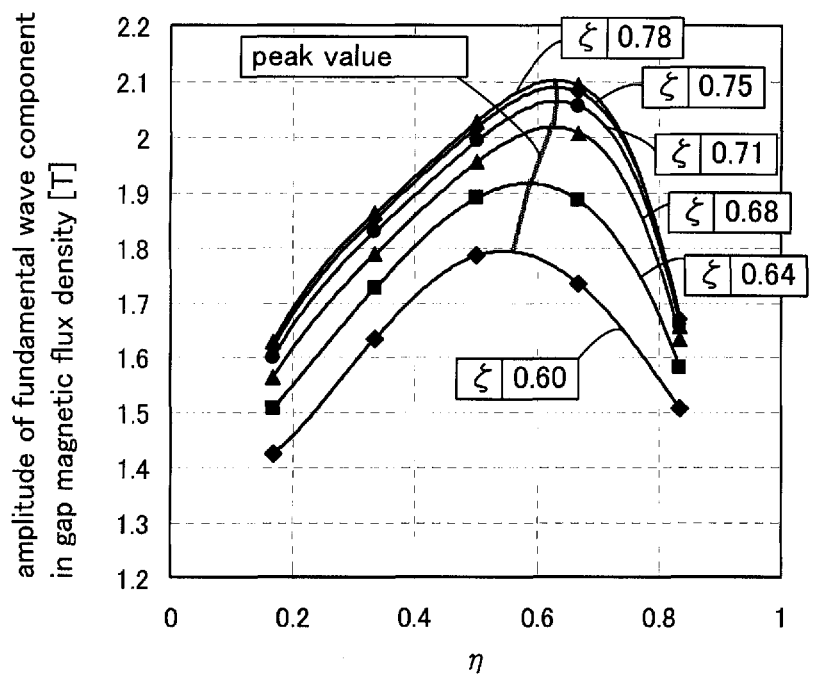
FIG. 7 is a graph indicating approximate curves according to polynomials of the respective polygonal lines plotted in FIG. 6, as well as a curve connecting peaks of these approximate curves.

FIG. 7 is a graph indicating approximate curves according to polynomials (a fourth-order equation in this case) of the polygonal lines respectively plotted in FIG. 6, as well as indicating a curve connecting peaks (in other words, the maximum values of the amplitudes of the fundamental wave components) of these approximate curves. An approximate equation of the curve connecting the peaks is expressed by Equation (8) with use of the amplitude Bg1 of the fundamental wave component in the gap magnetic flux density, which is indicated along the vertical axis of the graph.

[Expression 8]

$$B_{g1} = 3.8832 \times \eta - 0.373 \quad \text{Equation (8)}$$

Figure 8:
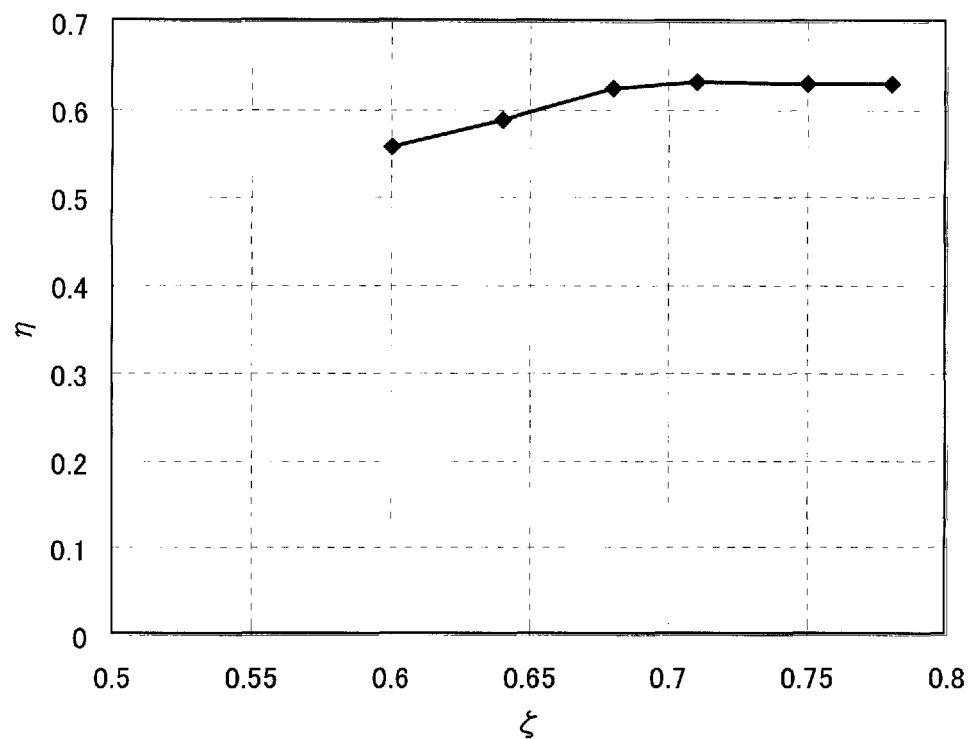
FIG. 8 is a graph indicating a relation between values of a rate $\eta$ at the peaks of the respective approximate curves of FIG. 7 and values of a rate $\zeta$ according to the respective approximate curves.

FIG. 8 is a graph indicating a relation between the values of the rate η at the peaks of the respective approximate curves of FIG. 7 and the values of the rate ζ according to the respective approximate curves. As seen from this graph, by setting the rate η to approximately 0.6, the amplitude of the fundamental wave component in the gap magnetic flux density can be further approximated to the peak value in accordance with the rate ζ, the number of the magnetic poles, the radii R1 to R3, and the thickness L, which are arbitrarily set. The rate η is desirably set to 0.6, in which case the difference is minimized between the set value of the rate η and the actual rate η that changes in accordance with the rate ζ.

The two rates η and ζ are associated with each other by Equation (9), which is an approximate equation of the curve shown in FIG. 8. By setting the rate η and the rate ζ in accordance with Equation (9), the amplitude of the fundamental wave component in the gap magnetic flux density can be set to the peak value in accordance with the number of the magnetic poles, the radii R1 to R3, and the thickness L, which are set arbitrarily.

[Expression 9]

$$\eta = -3.5188 \times \zeta^3 + 3.3628 \times \zeta^2 + 0.8094 \times \zeta - 0.3794 \quad \text{Equation (9)}$$

The followings are processes of determining the two rates η and ζ that maximize (set to the peak value) the amplitude of the fundamental wave component in the gap magnetic flux density. Firstly calculated is the rate ζ in accordance with Equation (7) with use of the outer radius R of the first permanent magnet 22 and the outer radius R1 of the rotor 2. The rate η is then calculated in accordance with Equation (9). These results determine the optimum value of the rate η according to a certain value of the rate ζ. Lastly, the rate η thus obtained is substituted to Equation (8) to obtain the peak value of the amplitude of the fundamental wave component in the gap magnetic flux density according to the certain value of the rate ζ.

Second Embodiment

Figure 9:
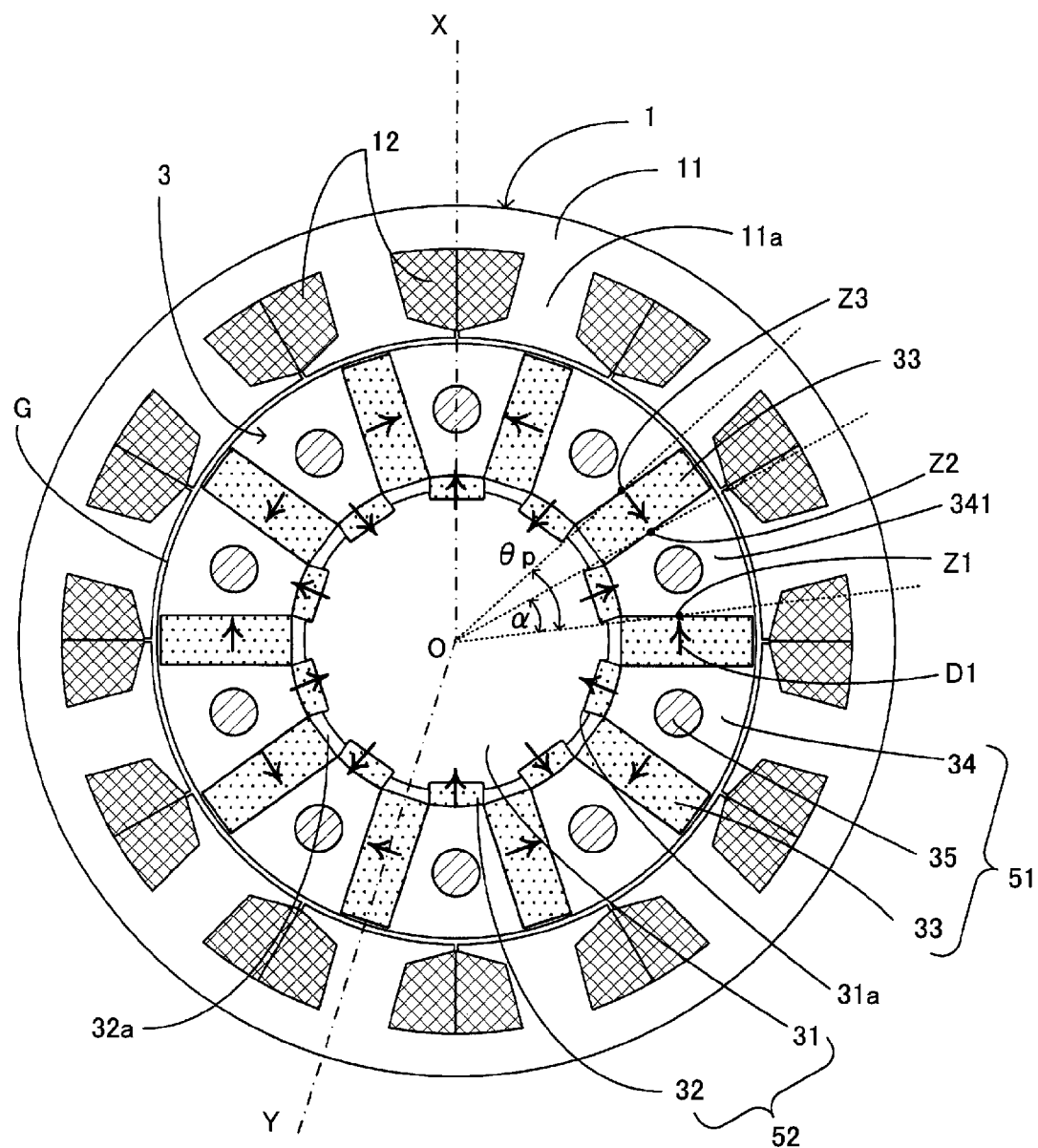
FIG. 9 is a cross sectional view of a rotating electrical machine according to a second embodiment.
Figure 10:
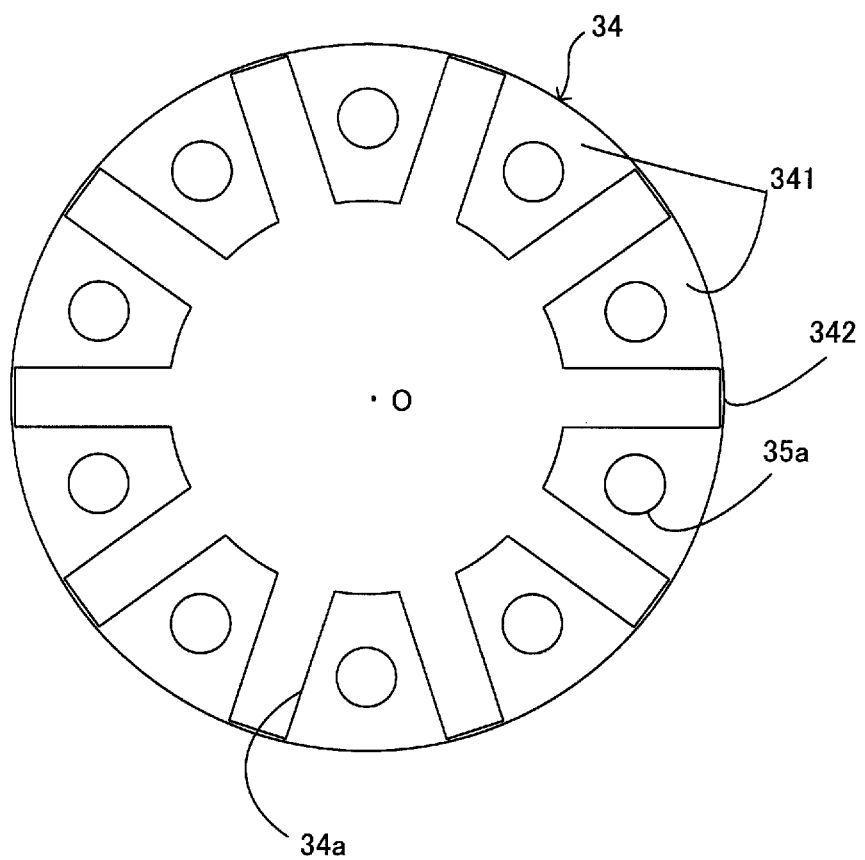
FIG. 10 is a cross sectional view of a rotor core shown in FIG. 9.
Figure 11A:
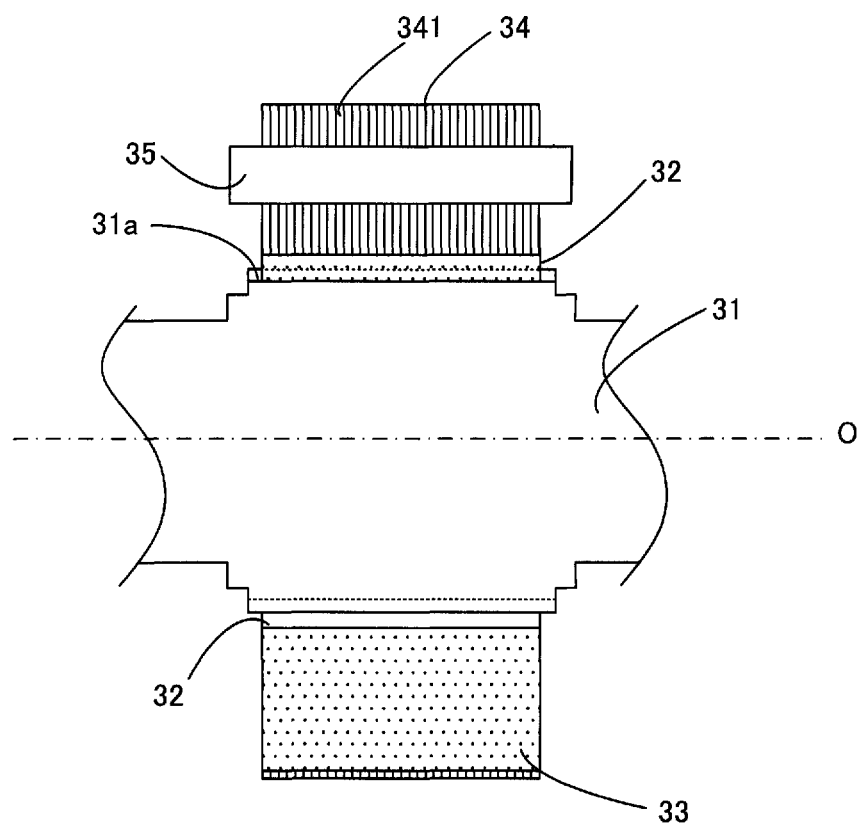
FIG. 11A is a cross sectional view of a rotor shown in FIG. 9.

Described with reference to FIGS. 9, 10, 11A, and 11B is a rotating electrical machine according to a second embodiment, which includes a rotor prepared in view of productability and mechanical strength. FIG. 9 is a cross sectional view of the rotating electrical machine according to the second embodiment. FIG. 10 is a cross sectional view of a rotor core shown in FIG. 9. FIG. 11A is a cross sectional view of the rotor shown in FIG. 9. FIG. 11B is a view showing brackets in addition to the structure of FIG. 11A. FIGS. 9, 10, 11A, and 11B respectively illustrate a rotational axis O of the rotor. Shown in FIG. 9 is a cross section of the rotating electrical machine taken along a line perpendicular to the rotational axis O. In FIG. 10, there is shown a cross section of the rotor core of FIG. 9 taken along a line perpendicular to the rotational axis O. FIGS. 11A and 11B each show a cross section of the rotor of FIG. 9 taken along a line XOY. FIG. 9 illustrates a gap G provided between the rotor and a stator. Directions of magnetization of permanent magnets are indicated in FIG. 9 by arrows D1 each in either direction. In FIGS. 9, 10, 11A, and 11B, the components same as those of the first embodiment are denoted by the identical symbols, and description thereof will not be repeated where appropriate.

In FIG. 9, the rotating electrical machine according to the second embodiment includes a stator 1 and a rotor 3. The stator 1 surrounds the rotor 3 having a substantially cylindrical shape with the gap G provided therebetween. FIG. 9 exemplifies a case where twelve teeth 11a are provided.

In this example, the rotating electrical machine functions as an electric motor. In this case, when current or the like flows in stator windings 12, there is generated a rotating magnetic field that causes the rotor 3 to rotate in the circumferential direction.

The rotor 3 has a shaft 31, first permanent magnets 32, second permanent magnets 33, a rotor core 34, support members 35, a bracket 36, and a bracket 37. The rotor 3 is divided into two portions, namely, an outer structure 51 that retains the second permanent magnets 33 and an inner structure 52 that retains the first permanent magnets 32.

The outer structure 51 is mainly configured by the second permanent magnets 33, the rotor core 34, and the support members (such as round bars) 35. As shown in FIGS. 10 and 11A, the rotor core 34 is configured by electromagnetic steel plates laminated along the rotational axis O. The rotor core 34 is provided in an inner circumferential surface thereof with grooves 34a that are aligned at a constant interval in the circumferential direction to respectively bury the second permanent magnets 33. The grooves 34a are concave along the rotational axis O, and the number of the grooves 34a is equal to that of the first permanent magnets 32. The grooves 34a each have a bottom 342 (which is on an outer circumferential portion of the rotor core 34 and faces the gap to function as a coupler to be described later). As shown in FIG. 10, the bottom 342 desirably has a shape to allow the outer circumferential surface of the rotor core 34 to secure circularity and cylindricity. Due to provision of the grooves 34a as shown in FIG. 10, the rotor core 34 is configured by a plurality of core pieces 341 and the couplers (the bottoms 342 of the grooves 34a). The core pieces 341 are aligned in the circumferential direction of the rotor core 34 at a constant interval. Each of the couplers connects the adjacent core pieces 341 with each other on the outer circumferential end of the rotor core 34. The core pieces 341 are each provided with a through hole 35a that allows the corresponding support member 35 to be inserted therethrough.

Each of the second permanent magnets 33 has a substantially flat plate shape, and is magnetized such that the direction of magnetization is along the shorter side thereof in a cross section perpendicular to the rotational axis O. The magnetized second permanent magnets 33 are inserted respectively into the grooves 34a and are bonded to the rotor core 34. Thus, the second permanent magnets 33 and the rotor core 34 are integrated together. In this case, as shown in FIG. 9, the directions of magnetization of the respective second permanent magnets 33 are same as those of the first embodiment.

Alternatively, the second permanent magnets 33 may be magnetized so as to have the directions of magnetization as shown in FIG. 9 after the second permanent magnets 33 are inserted respectively into the grooves 34a and are bonded to the rotor core 34.

The support members 35 are each made of an ordinary material of iron series or ceramic series. The support members 35 are each inserted into the corresponding through hole 35a in the core piece 341. The support members 35 and the brackets 36 and 37 support the rotor core 34 and the second permanent magnets 33. In this configuration, the rotor core 34 and the second permanent magnets 33 are retained even when a torque or a centrifugal force is applied thereto.

The inner structure 52 is mainly configured by the shaft 31 and the first permanent magnets 32. The shaft 31 is provided in the outer circumferential surface thereof with grooves 31a that are aligned at a constant interval in the circumferential direction to respectively bury the first permanent magnets 32. The grooves 31a are concave along the rotational axis O, and the number of the grooves 31a is equal to that of the first permanent magnets 32. The first permanent magnets 32 have a substantially flat plate shape. FIG. 9 exemplifies a case where ten first permanent magnets 32 are provided. The first permanent magnets 32 are each magnetized such that the direction of magnetization is along the shorter side thereof in a cross section perpendicular to the rotational axis O. The magnetized first permanent magnets 32 are inserted respectively into the grooves 31a and are bonded to the shaft 31. Thus, the first permanent magnets 32 and the shaft 31 are integrated together. In this case, as shown in FIG. 9, the directions of magnetization of the respective first permanent magnets 32 are same as those of the first embodiment. Between the first permanent magnets 32 adjacent to each other in the circumferential direction of the rotor 3, there are formed interspaces 32a that are provided as spaces or are filled with a resin or the like.

Alternatively, the first permanent magnets 32 may be magnetized so as to have the directions of magnetization as shown in FIG. 9 after the first permanent magnets 32 are inserted respectively into the grooves 31a and are bonded to the shaft 31.

The inner structure 52 configured as described above is fitted radially inside the outer structure 51 and is thus integrated with the outer structure 51. In this state, each of the second permanent magnets 33 is located radially outside the circumferential ends of the corresponding first permanent magnets 32 that are adjacent to each other in the circumferential direction of the shaft 31. In the first permanent magnet 32 and the two second permanent magnets 33 which are adjacent to the same core piece 341, the magnetic poles are identical to one another on the ends facing the core piece 341. As shown in FIG. 11B, the inner structure 52 and the outer structure 51 fitted to each other are connected by the two brackets 36 and 37 that are fixed at respective ends thereof in the rotational axis O direction.

As shown in FIG. 11A, the length in the rotational axis O direction of the grooves 31a, which are formed in the outer circumferential surface of the shaft 31, is larger than the length in the rotational axis O direction of the first permanent magnets 32. The spaces in the grooves 31a not filled with the first permanent magnets 32 allow the shaft 31 to have a spline shape at the respective ends thereof in the rotational axis O direction.

As shown in FIG. 11B, the brackets 36 and 37 have round holes 36a and 37a, respectively, which allow the support members 35 to be fitted thereinto. The bracket 36 is provided, on the end facing the shaft 31 and the first permanent magnets 32, with a fitting portion 36b having a shape to be fitted to a first end of the shaft 31 in the spline shape. The bracket 37 is provided, on the end facing the shaft 31 and the first permanent magnets 32, with a fitting portion 37b having a shape to be fitted to a second end of the shaft 31 in the spline shape. The bracket 36 is inserted from the first end of the shaft 31, the first end of the shaft 31 is fitted to the fitting portion 36b, and the support members 35 are press fitted into or bonded to the round holes 36a, respectively. Similarly, the bracket 37 is inserted from the second end of the shaft 31, the second end of the shaft 31 is fitted to the fitting portion 37b, and the support members 35 are press fitted into or bonded to the round holes 37a, respectively. The outer structure 51 and the inner structure 52 are therefore integrated with each other.

As described above, in the present embodiment, each of the core pieces 341 is provided between the two second permanent magnets 33 that are adjacent to each other in the circumferential direction of the rotor 3. Therefore, it is possible to easily increase the amplitude of the fundamental wave component in the gap magnetic flux density as well as to easily achieve reduction in size and increase in output power.

The rotor 3 is divided into the two portions, namely, the inner structure 52 and the outer structure 51 in the present embodiment. Accordingly, the rotor 3 of the MMASPM array can be easily manufactured by simply fitting the two portions to each other.

In the present embodiment, the bracket 36 is inserted from the first end of the shaft 31 in the rotational axis O direction, and is fixed to first ends of the core pieces 341 as well as to first ends of the second permanent magnets 33 in the rotational axis O direction. Similarly, the bracket 37 is inserted from the second end of the shaft 31 in the rotational axis O direction, and is fixed to second ends of the core pieces 341 as well as to second ends of the second permanent magnets 33 in the rotational axis O direction. This configuration enhances the mechanical strength of the rotor 3.

Further, in the present embodiment, the bracket 36 is fitted to the first end of the shaft 31 at the fitting portion 36b, and the bracket 37 is fitted to the second end of the shaft 31 at the fitting portion 37b. This configuration further enhances the mechanical strength of the rotor 3 in the rotational direction (the circumferential direction) thereof. Moreover, provision of the support members 35 still enhances the mechanical strength of the rotor 3 in the rotational direction thereof.

The rotating electrical machine of the present embodiment may be optimized in accordance with the first embodiment. In this case, as shown in FIG. 9 for example, assume that Z1 is a center point in the radial direction on a first circumferential end surface of the core piece 341, and that Z2 is a center point in the radial direction on a second circumferential end surface of the core piece 341. Further, assume that Z3 is a center point in the radial direction on a second circumferential end surface of the second permanent magnet 33. Then, the center point Z2 is also located on a center point in the radial direction on a first circumferential end surface of the second permanent magnet 33. An open angle Cc of the core piece 341 is equal to an acute angle between a line connecting the center point Z1 to the rotational axis O and a line connecting the center point Z2 to the rotational axis O. An open angle θp for one magnetic pole (formed by the second permanent magnet 33 and the core piece 341 adjacent to each other) is equal to an acute angle between the line connecting the center point Z1 to the rotational axis O and a line connecting the center point Z3 to the rotational axis O. The open angle α of the core piece 341 and the open angle θp for one magnetic pole are substituted to Equation (6) to obtain a rate η, which is to be optimized in accordance with the first embodiment. Further, assume that R is an outer radius of the first permanent magnets 32 provided to surround the shaft 31, and the outer radius R is substituted to Equation (7) to obtain a rate ζ, which is to be optimized in accordance with the first embodiment. Needless to say, the rotating electrical machine of the present embodiment can easily achieve increase in the amplitude of the fundamental wave component in the gap magnetic flux density as well as reduction in size and increase in output power thereof, without being optimized in accordance with the first embodiment.

Third Embodiment

Figure 12:
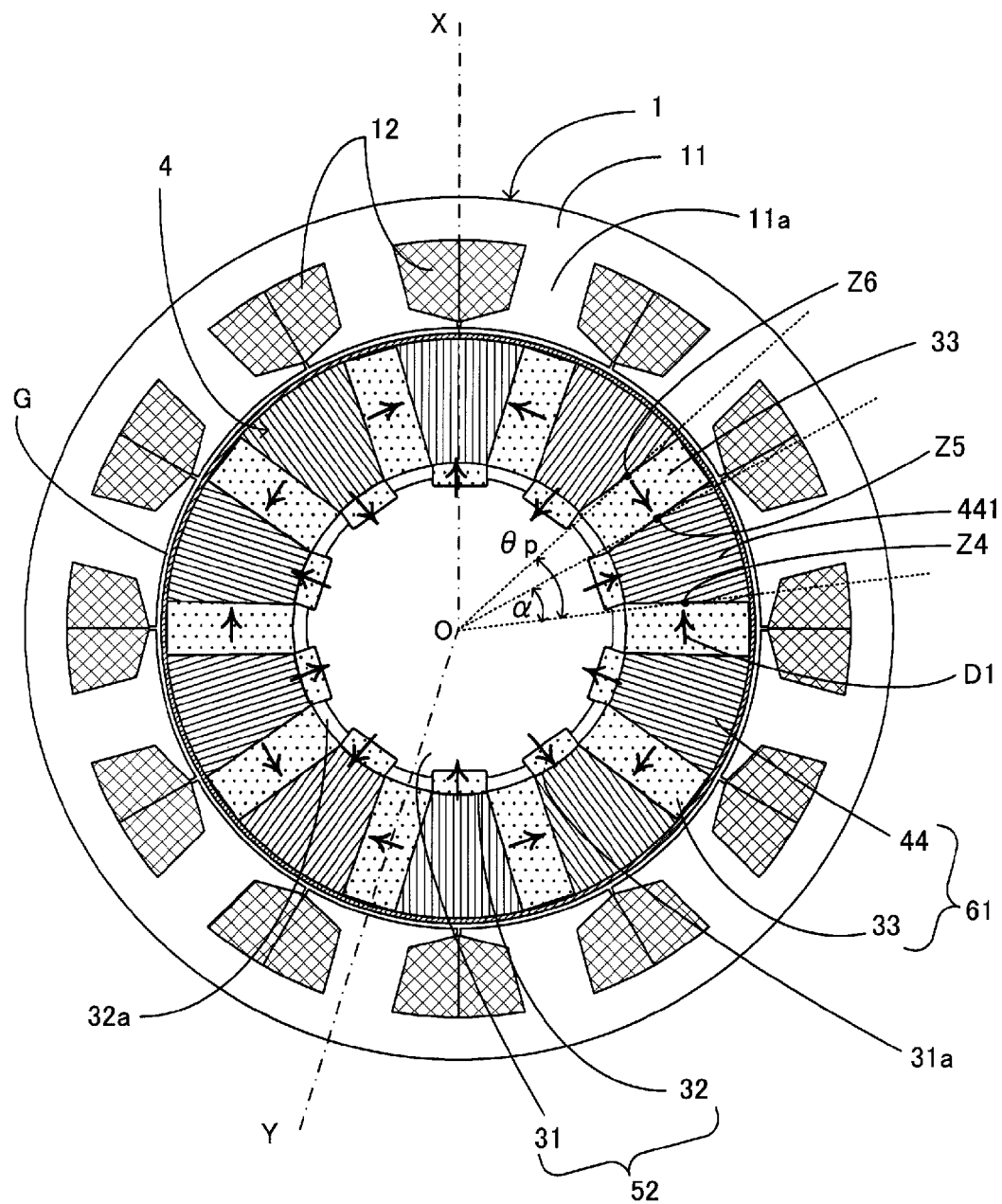
FIG. 12 is a cross sectional view of a rotating electrical machine according to a third embodiment.
Figure 13:
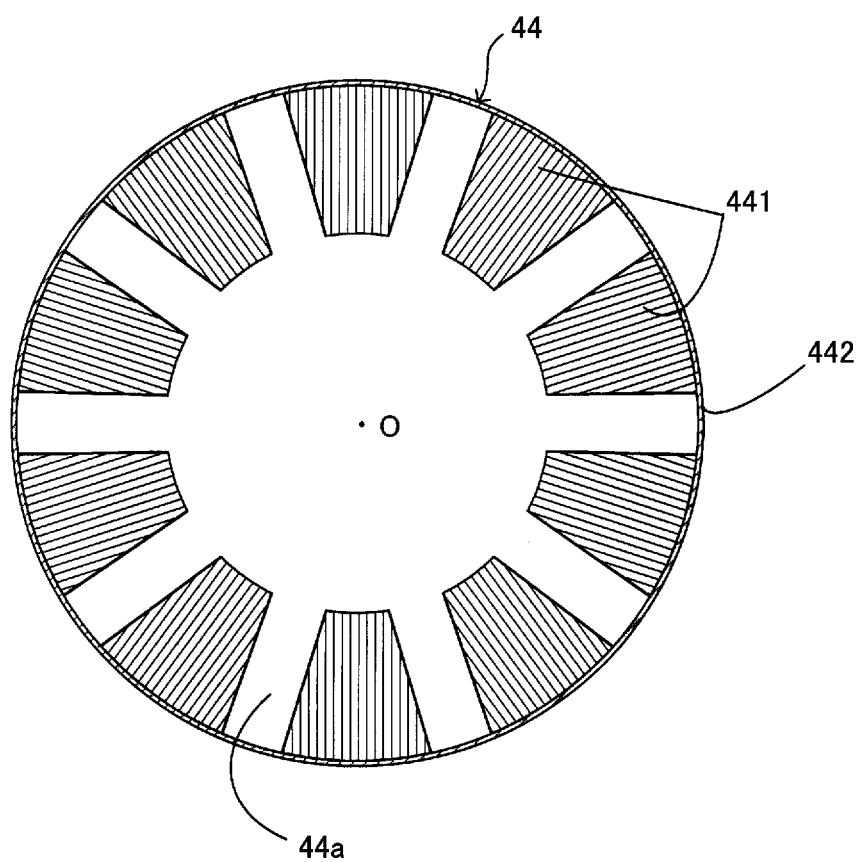
FIG. 13 is a cross sectional view of a rotor core shown in FIG. 12.
Figure 14A:
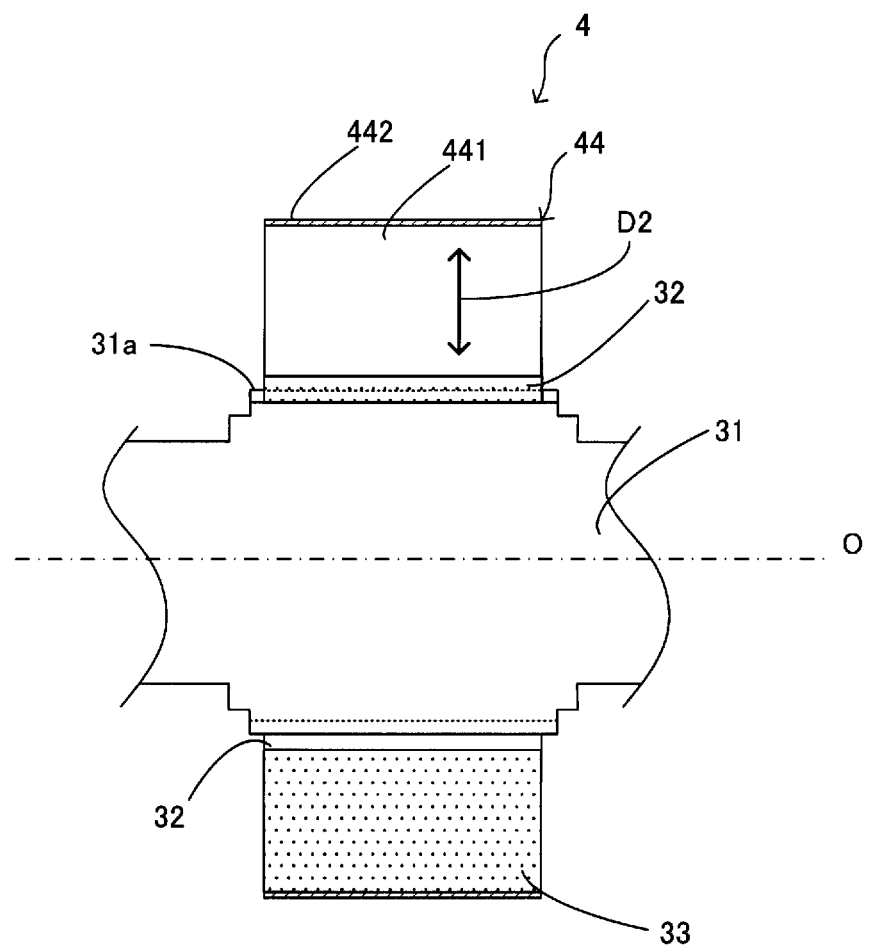
FIG. 14A is a cross sectional view of a rotor shown in FIG. 12.
Figure 14B:
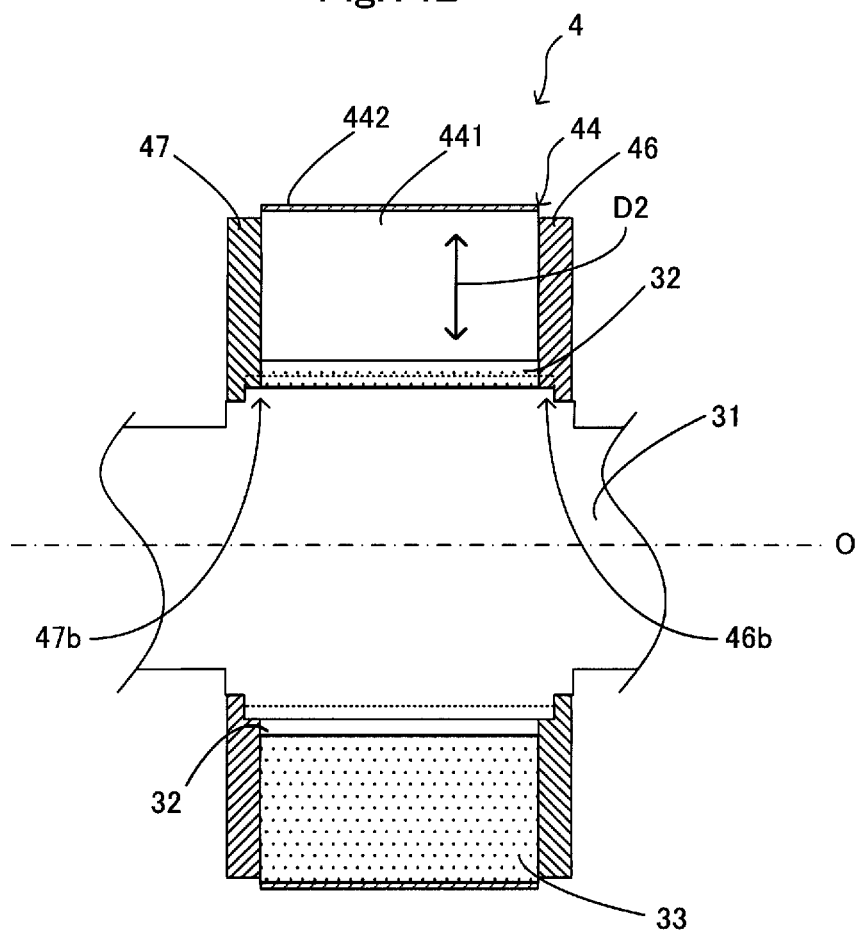
FIG. 14B is a view showing brackets in addition to the structure of FIG. 14A.

Described with reference to FIGS. 12, 13, 14A, and 14B is a rotating electrical machine according to a third embodiment prepared in view of productability and mechanical strength. FIG. 12 is a cross sectional view of the rotating electrical machine according to the third embodiment. FIG. 13 is a cross sectional view of a rotor core shown in FIG. 12. FIG. 14A is a cross sectional view of the rotor shown in FIG. 12. FIG. 14B is a view showing brackets in addition to the structure shown in FIG. 14A. FIGS. 12, 13, 14A, and 14B respectively illustrate a rotational axis O of the rotor. Shown in FIG. 12 is a cross section of the rotating electrical machine taken along a line perpendicular to the rotational axis O. FIG. 13 shows a cross section of the rotor core of FIG. 12, taken along a line perpendicular to the rotational axis O. FIGS. 14A and 14B each show a cross section of the rotor of FIG. 12 taken along a line XOY. FIG. 12 illustrates a gap G provided between the rotor and a stator. Directions of magnetization of permanent magnets are indicated in FIG. 12 by arrows D1 each in either direction. Shown in each of FIGS. 14A and 14B is an arrow D2 in both directions which indicates the directions of easy magnetization of directional electromagnetic steel plates. In FIGS. 12, 13, 14A, and 14B, the components same as those of the second embodiment are denoted by the identical symbols, and description thereof will not be repeated where appropriate.

The rotating electrical machine according to the present embodiment is different from the rotating electrical machine according to the second embodiment in that the rotor 3 and the rotor core 34 are replaced with a rotor 4 and a rotor core 44, the support members 35 are not provided, and the brackets 36 and 37 are replaced with brackets 46 and 47. The components other than the above are provided similarly to the second embodiment and are denoted by the identical symbols, description of which will not be repeated where appropriate.

In FIG. 12, the rotating electrical machine according to the third embodiment includes a stator 1 and the rotor 4. The stator 1 surrounds the rotor 4 having a substantially cylindrical shape with the gap G provided therebetween. FIG. 12 exemplifies a case where twelve teeth 11a are provided.

In this example, the rotating electrical machine functions as an electric motor. In this case, when current or the like flows in stator windings 12, there is generated a rotating magnetic field that causes the rotor 4 to rotate in the circumferential direction thereof.

The rotor 4 has a shaft 31, first permanent magnets 32, second permanent magnets 33, the rotor core 44, and the brackets 46 and 47. The rotor 4 is divided into two portions, namely, an outer structure 61 that retains the second permanent magnets 33 and an inner structure 52 that retains the first permanent magnets 32.

The outer structure 61 is mainly configured by the second permanent magnets 33 and the rotor core 44. As shown in FIGS. 13 and 14A, the rotor core 44 is configured by a plurality of core pieces 441 and a cylindrical member 442. The core pieces 441 are configured by lamination of the directional electromagnetic steel plates. The core pieces 441 are aligned at a constant interval in the circumferential direction of the rotor 4. As shown in FIG. 13, the lamination in the core pieces 441 is in the circumferential direction of the rotor 4. As indicated in FIGS. 14A and 14B, the directional electromagnetic steel plates, which configure each of the core pieces 441, have the directions of easy magnetization in parallel with the radial direction of the rotor 4. The core pieces 441 shown in FIG. 13 each have a substantially trapezoidal shape in a cross section. These core pieces 441 may be manufactured in accordance with the following method, for example. Firstly, the plurality of directional electromagnetic steel plates are laminated such that the directions of easy magnetization are aligned with one another. The laminated directional electromagnetic steel plates are processed to have the substantially trapezoidal shape shown in FIG. 13, with use of a wire cutter or a pressing machine. There are thus formed the core pieces 441 shown in FIG. 13.

There is provided the cylindrical member 442, which is thin and has a substantially cylindrical shape, so as to surround the core pieces 441. In this configuration, the core pieces 441 are connected and integrated together. As described above, the rotor core 44 is configured by the plurality of core pieces 441 that are aligned in the circumferential direction at a constant interval and the cylindrical member 442 functioning as a coupler that connects the core pieces 441 together on the outer circumferential end of the rotor core 44. The cylindrical member 442 is a member of high mechanical strength, such as a pipe of stainless steel series. Alternatively, the cylindrical member 442 may be configured by amorphous foil bands, which are each curved into a cylindrical shape and are laminated in the radial direction. Provision of the cylindrical member 442 thus configured reduces a risk that the core pieces 441 fly apart due to a centrifugal force or a torque.

The second permanent magnets 33 have a substantially flat plate shape. Each of the second permanent magnets 33 is magnetized such that the direction of magnetization is along the shorter side thereof in a cross section perpendicular to the rotational axis O. The magnetized second permanent magnets 33 are inserted respectively into clearances 44a that are each provided between the core pieces 441 adjacent to each other in the circumferential direction of the rotor 4, and are bonded to the rotor core 44. The number of the clearances 44a is equal to that of the first permanent magnets 32. In this case, as shown in FIG. 12, the directions of magnetization of the respective second permanent magnets 33 are same as those of the first embodiment.

Alternatively, the second permanent magnets 33 may be magnetized so as to have the directions of magnetization as shown in FIG. 12 after the second permanent magnets 33 are inserted respectively into the clearances 44a and are bonded to the rotor core 44. Since the inner structure 52 is configured similarly to that of the second embodiment, description thereof will not be repeated in the present embodiment.

The inner structure 52 thus configured is fitted radially inside the outer structure 61. In this state, each of the second permanent magnets 33 is located radially outside the circumferential ends of the corresponding first permanent magnets 32 that are adjacent to each other in the circumferential direction of the shaft 31. In the first permanent magnet 32 and the two second permanent magnets 33 which are adjacent to the same core piece 441, the magnetic poles are identical to one another on the ends facing the core piece 441. As shown in FIG. 14B, the inner structure 52 and the outer structure 61 fitted to each other are connected by the two brackets 46 and 47 that are fixed at respective ends thereof in the rotational axis O direction.

As shown in FIG. 14A, the length in the rotational axis O direction of the grooves 31a, which are formed in the outer circumferential surface of the shaft 31, is larger than the length in the rotational axis O direction of the first permanent magnets 32. The spaces in the grooves 31a not filled with the first permanent magnets 32 allow the shaft 31 to have a spline shape at the respective ends thereof in the rotational axis O direction.

As shown in FIG. 14B, the bracket 46 is provided, on the end facing the shaft 31 and the first permanent magnets 32, with a fitting portion 46b having a shape to be fitted to a first end of the shaft 31 in the spline shape. The bracket 47 is provided, on the end facing the shaft 31 and the first permanent magnets 32, with a fitting portion 47b having a shape to be fitted to a second end of the shaft 31 in the spline shape. The bracket 46 is inserted from the first end of the shaft 31, which is fitted to the fitting portion 46b. Similarly, the bracket 47 is inserted from the second end of the shaft 31, which is fitted to the fitting portion 47b. The outer structure 61 and the inner structure 52 are thus integrated with each other.

As described above, in the present embodiment, each of the core pieces 441 is provided between the two second permanent magnets 33 that are adjacent to each other in the circumferential direction of the rotor 4. Therefore, it is possible to easily increase the amplitude of the fundamental wave component in the gap magnetic flux density as well as to easily achieve reduction in size and increase in output power.

The rotor 4 is divided into the two portions, namely, the inner structure 52 and the outer structure 61 in the present embodiment. Accordingly, the rotor 4 of the MMASPM array can be easily manufactured by simply fitting the two portions to each other.

In the present embodiment, the bracket 46 is inserted from the first end of the shaft 31 in the rotational axis O direction, and is fixed to first ends of the core pieces 441 as well as to first ends of the second permanent magnets 33 in the rotational axis O direction. Similarly, the bracket 47 is inserted from the second end of the shaft 31 in the rotational axis O direction, and is fixed to second ends of the core pieces 441 as well as to second ends of the second permanent magnets 33 in the rotational axis O direction. This configuration enhances the mechanical strength of the rotor 4.

Further, in the present embodiment, the bracket 46 is fitted to the first end of the shaft 31 at the fitting portion 46b, and the bracket 47 is fitted to the second end of the shaft 31 at the fitting portion 47b. This configuration further enhances the mechanical strength of the rotor 4 in the rotational direction (the circumferential direction).

In the present embodiment, each of the core pieces 441 is configured by the directional electromagnetic steel plates, the directions of easy magnetization of which are aligned with the radial direction of the rotor 4. Thus, the magnetic fluxes generated by the first permanent magnets 32 and the second permanent magnets 33 are likely to advance in the radial direction of the rotor 4 but are unlikely to advance in the rotational axis O direction. In comparison to the rotor 3 of the second embodiment, the magnetic fluxes leaking in the rotational axis O direction is decreased in its rate, while the magnetic fluxes advancing in a direction perpendicular to the rotational axis O (the radial direction of the core pieces 441) is increased in its rate. As a result, the magnetic fluxes advancing from the outer circumferential end of the rotor 4 to the inner circumferential end of the stator 1 is increased in its rate, and thus increased are the magnetic fluxes interlinked with the stator windings 12. As a result, it is possible to achieve further reduction in size as well as increase in output power.

The present embodiment includes a case where the cylindrical member 442 is configured by the lamination of the amorphous foil bands. This case realizes suppression of eddy current loss caused in the cylindrical member 442 in comparison to the case where the cylindrical member 442 is configured by the pipe of stainless steel series. Moreover, since the amorphous foil band has a magnetic permeability higher than that of the pipe of stainless steel series, the cylindrical member 442 configured by the amorphous foil bands can be designed to achieve a high gap magnetic flux density. Furthermore, each of the amorphous foil bands is as thin as approximately 0.25 μm. Thus, by finely regulating the number of the laminated foil bands to reduce the thickness of the cylindrical member 442 as much as possible, it is possible to maximize the gap magnetic flux density. This configuration also facilitates designing the cylindrical member 442 that can sufficiently achieve mechanical strength as required.

The rotating electrical machine according to the present embodiment may be optimized in accordance with the first embodiment. In this case, as shown in FIG. 12 for example, assume that Z4 is a center point in the radial direction on a first circumferential end surface of the core piece 441, and that Z5 is a center point in the radial direction on a second circumferential end surface of the core piece 441. Further, assume that Z6 is a center point in the radial direction on a second circumferential end surface of the second permanent magnet 33. Then, the center point Z5 is also located on a center point in the radial direction on a first circumferential end surface of the second permanent magnet 33. An open angle α of the core piece 441 is equal to an acute angle between a line connecting the center point Z4 to the rotational axis O and a line connecting the center point Z5 to the rotational axis O. An open angle θp for one magnetic pole (formed by the second permanent magnet 33 and the core piece 441 adjacent to each other) is equal to an acute angle between the line connecting the center point Z4 to the rotational axis O and a line connecting the center point Z6 to the rotational axis O. The open angle α of the core piece 441 and the open angle θp for one magnetic pole are substituted to Equation (6) described above to obtain a rate η, which is to be optimized in accordance with the first embodiment. Further, assume that R is an outer radius of the first permanent magnets 32 provided to surround the shaft 31, and the R is substituted to Equation (7) to obtain a rate ζ, which is to be optimized in accordance with the first embodiment. Needless to say, the rotating electrical machine of the present embodiment can easily achieve increase in the amplitude of the fundamental wave component in the gap magnetic flux density as well as reduction in size and increase in output power thereof, without being optimized in accordance with the first embodiment.

Figure 15:
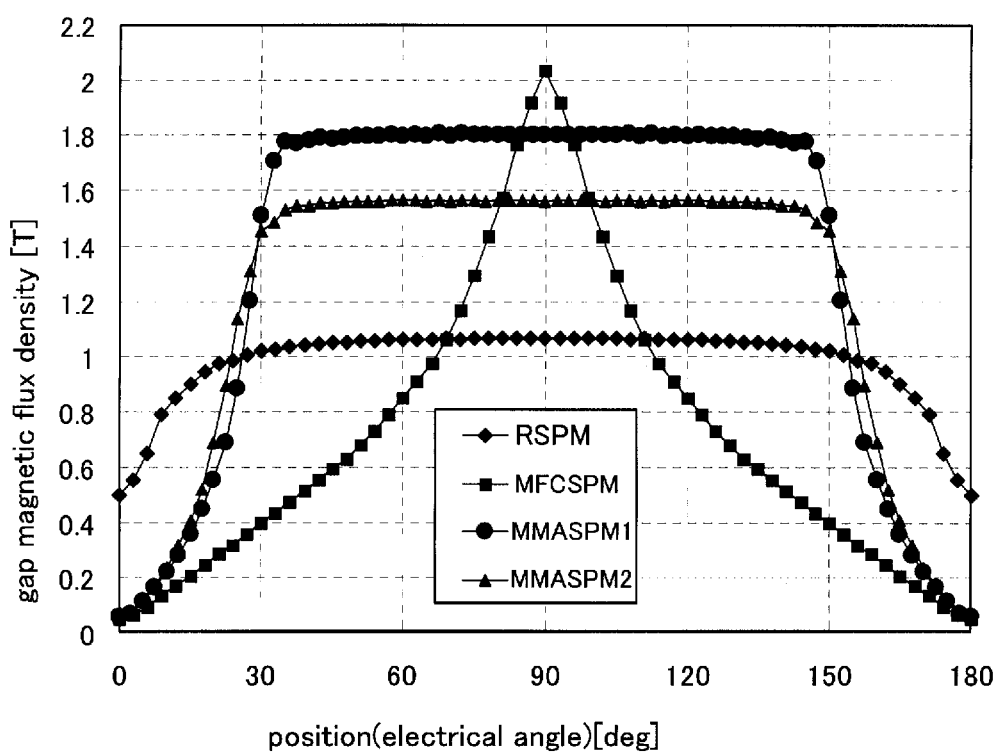
FIG. 15 is a graph indicating distribution waveforms of gap magnetic flux densities.

Described next are results of verification on the effects exerted in the above first and second embodiments. FIG. 15 is a graph indicating distribution waveforms of the gap magnetic flux densities calculated in accordance with the magnetic field analyses. In FIG. 15, the distribution waveform of the RSPM array is obtained in a case where the permanent magnets are 5 mm thick in the radial direction. The distribution waveform of the MFCSPM array is obtained in a case where both the first and second permanent magnets are 5 mm thick in the radial direction. The distribution waveform of the MMASPM array in the first embodiment (hereinafter, referred to as an MMASPM1 array) is obtained in a case where the second permanent magnets and the core pieces of the first embodiment have the optimum sizes as described above, respectively. The distribution waveform of the MMASPM array in the second embodiment (hereinafter, referred to as an MMASPM2 array) is obtained in a case where the second permanent magnets and the core pieces of the second embodiment have the optimum sizes as described above, respectively. As apparent from FIG. 15, all the gap magnetic flux densities of the MFCSPM array, the MMASPM1 array, and the MMASPM2 array are larger than the gap magnetic flux density of the RSPM array.

Figure 16:
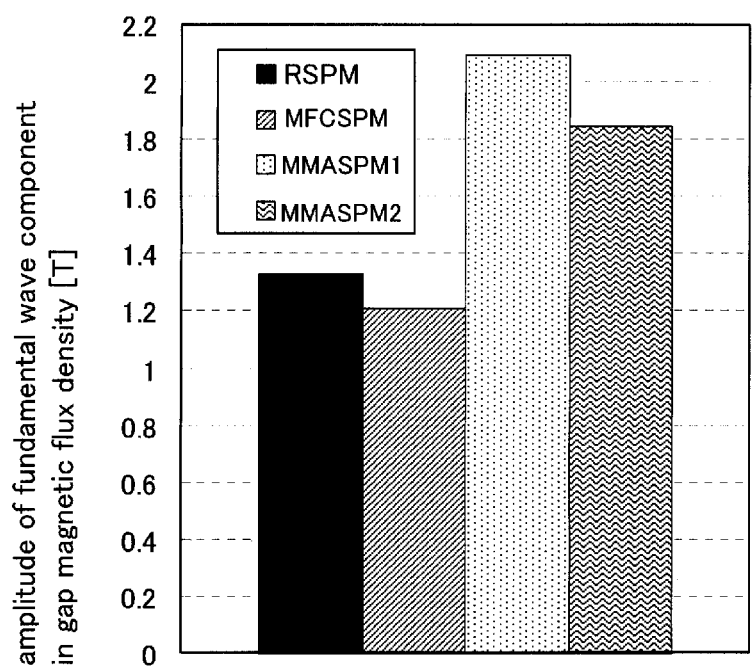
FIG. 16 is a graph indicating magnitudes of amplitudes of fundamental wave components included in the distribution waveforms of FIG. 15.

FIG. 16 is a graph indicating magnitudes of the amplitudes of the fundamental wave components in the distribution waveforms of FIG. 15. Comparing the RSPM array and the MFCSPM array, the amplitude of the fundamental wave component of the MFCSPM array is smaller than that of the RSPM array. This is because, as shown in FIG. 15, the MFC- SPM array has the distribution waveform of the gap magnetic flux density in a shape similar to a triangular waveform. On the other hand, the amplitudes of the fundamental wave components in the distribution waveforms in the MMASPM1 array (according to the first embodiment) and the MMASPM2 array (according to the second embodiment) are larger than those of the RSPM array and the MFCSPM array. The amplitude of the fundamental wave component in the distribution waveform in the MMASPM2 array (according to the second embodiment) is larger by at least 1.3 times than those of the RSPM array and the MFCSPM array. Consequently, the rotating electrical machines according to the first and second embodiments are recognized as exerting the sufficiently large effects. It is noted that the effect exerted in the third embodiment should be sufficiently large, although not referred to herein.

The rotating electrical machine according to each of the embodiments described above is assumed to function as an electric motor. However, the present invention is not limited thereto, but the rotating electrical machine according to each of the embodiments may function as a power generator.

Briefly shown in FIG. 17 is a method for manufacturing the rotor according to one of the second and third embodiments described above. In FIG. 17, the first permanent magnets are accommodated respectively in the even number of grooves that are provided in the outer circumferential end of the shaft, so that the shaft and the first permanent magnets are integrated together to form the inner structure (S1). The core pieces of the number equal to that of the first permanent magnets are aligned at a constant interval in the circumferential direction and are connected with each other at the outer circumferential ends thereof, and the second permanent magnets are accommodated respectively in spaces between the core pieces, so that the core pieces and the second permanent magnets are integrated together to form the outer structure (S2). Then, the inner structure is fitted in the inner circumferential end of the outer structure such that the second permanent magnets are located radially outside with respect to the circumferential ends of the first permanent magnets adjacent to each other in the circumferential direction of the shaft (S3). The brackets are inserted to the respective ends in the rotational axis direction of the inner structure and the outer structure fitted to each other (S4). Through these steps, the rotor is formed.

Described above are the respective embodiments of the present invention. However, it is apparent to those skilled in the art that the above embodiments can be appropriately modified or can be appropriately combined with the techniques according to modifications without departing from the gist of the present invention. It is clearly understood that such modified techniques are also included in the technical scope of the present invention.

What is claimed is:

1. A rotating electrical machine comprising:
a rotor having an outer circumferential end; and
a stator surrounding the outer circumferential end of the rotor with a gap provided therebetween,
the rotor including:
an even number of first permanent magnets aligned in a circumferential direction of the rotor;
second permanent magnets of a number equal to that of the first permanent magnets, provided respectively between the stator and circumferential ends of the first permanent magnets adjacent to each other in the circumferential direction; and
core pieces of a number equal to that of the first permanent magnets, provided respectively between the second permanent magnets adjacent to each other in the circumferential direction, wherein
each of the first permanent magnets has a direction of magnetization in parallel with a radial direction of the rotor,
the directions of magnetization of the first permanent magnets adjacent to each other in the circumferential direction are opposite to each other,
each of the second permanent magnets has a direction of magnetization perpendicular to the radial direction,
the directions of magnetization of the second permanent magnets adjacent to each other in the circumferential direction are opposite to each other,
the first permanent magnet and the two second permanent magnets which are adjacent to the core piece have magnetic poles identical to one another on ends facing the core piece, and
relative to a sum of an open angle of the core piece and an open angle of the second permanent magnet adjacent to the core piece in the circumferential direction, a rate of the open angle of the core piece is from 0.5 to 0.7.

2. A rotating electrical machine comprising:
a rotor having an outer circumferential end; and
a stator surrounding the outer circumferential end of the rotor with a gap provided therebetween,
the rotor including:
an even number of first permanent magnets aligned in a circumferential direction of the rotor;
second permanent magnets of a number equal to that of the first permanent magnets, provided respectively between the stator and circumferential ends of the first permanent magnets adjacent to each other in the circumferential direction; and
core pieces of a number equal to that of the first permanent magnets, provided respectively between the second permanent magnets adjacent to each other in the circumferential direction, wherein
each of the first permanent magnets has a direction of magnetization in parallel with a radial direction of the rotor,
the directions of magnetization of the first permanent magnets adjacent to each other in the circumferential direction are opposite to each other,
each of the second permanent magnets has a direction of magnetization perpendicular to the radial direction,
the directions of magnetization of the second permanent magnets adjacent to each other in the circumferential direction are opposite to each other,
the first permanent magnet and the two second permanent magnets which are adjacent to the core piece have magnetic poles identical to one another on ends facing the core piece, and
relative to a sum of an open angle of the core piece and an open angle of the second permanent magnet adjacent to the core piece in the circumferential direction, a rate of the open angle of the core piece is approximately 0.6.

3. The rotating electrical machine according to claim 1, wherein
a first rate of an open angle of the core piece relative to a sum of the open angle of the core piece and an open angle of the second permanent magnet adjacent to the core piece in the circumferential direction and a second rate of a thickness of the core piece in the radial direction of the rotor relative to a radius of the rotor are respectively set so as to maximize an amplitude of a fundamental wave of a magnetic flux density in the gap.

4. The rotating electrical machine according to claim 3, wherein
assuming that the first rate is $\eta$ and the second rate is $\zeta$, the first rate $\eta$ and the second rate $\zeta$ are set so as to satisfy an equation:

$$\eta=-3.5188\times\zeta^3+3.3628\times\zeta^2+0.8094\times\eta-0.3794.$$

5. The rotating electrical machine according to claim 1, wherein
the rotor further includes a shaft that has an outer circumferential end and is provided adjacent to the first permanent magnets such that the first permanent magnets are interposed between the stator and the shaft,
the shaft is provided in the outer circumferential end with grooves accommodating the first permanent magnets so as to be integrated with the first permanent magnets, and
the core pieces are connected to each other at ends, facing the stator, of the second permanent magnets, so as to be integrated with the second permanent magnets.

6. The rotating electrical machine according to claim 5, wherein the rotor further includes:
a first bracket that is inserted from a first end of the shaft in a rotational axis direction of the rotor, and is fixed to first ends of the core pieces and first ends of the second permanent magnets in the rotational axis direction; and
a second bracket that is inserted from a second end of the shaft in the rotational axis direction, and is fixed to second ends of the core pieces and second ends of the second permanent magnets in the rotational axis direction.

7. The rotating electrical machine according to claim 6, wherein
each of the first and second brackets is provided with a first fitting portion to be fitted into the grooves provided in the outer circumferential end of the shaft.

8. The rotating electrical machine according to claim 7, wherein
the rotor further includes support members that are provided to pass through the connected core pieces respectively in the rotational axis direction, and
each of the first and second brackets is provided with second fitting portions to be fitted to the support members.

9. The rotating electrical machine according to claim 6, wherein
the rotor further includes support members that are provided to pass through the connected core pieces respectively in the rotational axis direction, and
each of the first and second brackets is provided with fitting portions to be fitted to the support members.

10. The rotating electrical machine according to claim 5, wherein
each of the core pieces is configured by directional electromagnetic steel plates laminated in the circumferential direction of the rotor, and
the directional electromagnetic steel plates have directions of easy magnetization in parallel with the radial direction of the rotor.

11. The rotating electrical machine according to claim 10, wherein
the rotor further includes a cylindrical member provided between the core pieces and the stator.

12. The rotating electrical machine according to claim 11, wherein
the cylindrical member is configured by a steel pipe.

13. The rotating electrical machine according to claim 11, wherein
the cylindrical member is configured by amorphous foils laminated in a radial direction of the cylindrical member.

* * * * *